US011361038B2

(12) United States Patent
Lewin-Eytan et al.

(10) Patent No.: US 11,361,038 B2
(45) Date of Patent: Jun. 14, 2022

(54) METHOD AND SYSTEM FOR PROVIDING SUBSCRIBE AND UNSUBSCRIBE RECOMMENDATIONS

(71) Applicant: YAHOO ASSETS LLC, Dulles, VA (US)

(72) Inventors: Liane Lewin-Eytan, Binyamina (IL); Iftah Gamzu, Rishon Lezion (IL); Natalia Silberstein, Haifa (IL); Ian McCarthy, Sunnyvale, CA (US); Oren Shlomo Somekh, Bet-Yehoshua (IL); Keren Baruch, San Francisco, CA (US); Christopher Royer, Sunnyvale, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 177 days.

(21) Appl. No.: 15/590,405

(22) Filed: May 9, 2017

(65) Prior Publication Data

US 2018/0314761 A1 Nov. 1, 2018

Related U.S. Application Data

(60) Provisional application No. 62/490,689, filed on Apr. 27, 2017.

(51) Int. Cl.
*G06F 16/9535* (2019.01)
*H04L 51/04* (2022.01)
(Continued)

(52) U.S. Cl.
CPC ....... *G06F 16/9535* (2019.01); *G06Q 10/107* (2013.01); *G06Q 30/0207* (2013.01);
(Continued)

(58) Field of Classification Search
CPC ..... G06F 16/9535; G06F 17/30; H04L 51/12; H04L 51/14; H04L 51/04; H04L 12/58;
(Continued)

(56) References Cited

U.S. PATENT DOCUMENTS 9,773,257 B1\* 9/2017 Bodell ............... G06Q 30/0251
2009/0076884 A1\* 3/2009 Johnson ............... G06Q 10/087
705/320

(Continued)

*Primary Examiner* — Hicham Skhoun
(74) *Attorney, Agent, or Firm* — Venable LLP

(57) ABSTRACT

The present teaching relates to providing a recommendation for subscribing to or unsubscribing from an electronic communication. In one example, actions of a user are obtained with respect to electronic communications of the user. One or more categories of the electronic communications are determined. A state of the user is determined based on the actions and the one or more categories. The state is either a discovery state indicating that the user expresses an interest to receive electronic communications associated with a specific category or a cleaning state indicating that the user lacks an interest in one or more received electronic communications. A subscribe recommendation for subscribing to electronic communications associated with the specific category is provided when the state is determined to be a discovery state. An unsubscribe recommendation for unsubscribing from electronic communications similar to the one or more received electronic communications is provided when the state is determined to be a cleaning state.

24 Claims, 16 Drawing Sheets

(51) Int. Cl.
*H04L 51/00* (2022.01)
*G06Q 30/02* (2012.01)
*G06Q 10/10* (2012.01)

(52) U.S. Cl.
CPC ......... *G06Q 30/0251* (2013.01); *H04L 51/04* (2013.01); *H04L 51/14* (2013.01); *H04L 51/12* (2013.01)

(58) Field of Classification Search
CPC ............. G06Q 30/0207; G06Q 10/107; G06Q 30/0251
USPC ........................................................ 707/731
See application file for complete search history.

(56) References Cited

U.S. PATENT DOCUMENTS

| | | | |
|---|---|---|---|
| 2011/0258049 A1* | 10/2011 | Ramer | G06Q 30/0273 705/14.66 |
| 2012/0016875 A1* | 1/2012 | Jin | G06F 16/9535 707/734 |
| 2015/0281156 A1* | 10/2015 | Beausoleil | H04L 51/14 709/206 |
| 2016/0255139 A1* | 9/2016 | Rathod | H04L 51/046 709/203 |
| 2017/0017971 A1* | 1/2017 | Moreau | G06Q 30/0202 |
| 2020/0244615 A1* | 7/2020 | O'Brien | G06Q 30/0248 |

\* cited by examiner

METHOD AND SYSTEM FOR PROVIDING SUBSCRIBE AND UNSUBSCRIBE RECOMMENDATIONS

CROSS REFERENCE TO RELATED APPLICATION

This application claims priority to U.S. Application 62/490,689 filed Apr. 27, 2017, which is hereby expressly incorporated by reference in its entirety.

BACKGROUND

1. Technical Field

The present teaching relates to methods, systems, and programming for Internet services. Particularly, the present teaching is directed to methods, systems, and programming for providing a recommendation for subscribing to or unsubscribing from an electronic communication.

2. Discussion of Technical Background

Electronic mail ("email") has become an important means of electronic communication. An email message allows users to exchange information digitally across the Internet or other networks. With the increase of machine generated mail messages, which comprises more than 90% of today's web mail traffic, a user has a limited control over the emails that end up in his/her inbox. This can result in two opposite scenarios. First, there may be a large amount of machine generated messages sent regularly, that are irrelevant to the user and that the user would rather not receive, e.g. newsletters sent as a result of auto-subscription or updates from mailing lists that have become irrelevant. Second, the user may be interested in more updates or merchant offers related to a certain field of interest, but does not know precisely how to get them, e.g. promotions or coupons that the user would like to get in case they are related to an upcoming activity/purchase the user is planning.

Existing techniques about an email service can provide a button to a user for unsubscribing an address from a series of subscriptions. Existing methods focus on supporting an unsubscribe operation, rather than on providing subscribe or unsubscribe recommendations. While an existing system may unsubscribe a user in response to a user request to unsubscribe, the existing system does not perform any recommendation related to subscribe or unsubscribe before the user explicitly sends a request.

Therefore, there is a need to provide a recommendation for subscribing to or unsubscribing from an electronic communication to solve the above-mentioned problems.

SUMMARY

The present teaching relates to methods, systems, and programming for Internet services. Particularly, the present teaching is directed to methods, systems, and programming for providing a recommendation for subscribing to or unsubscribing from an electronic communication.

In one example, a method, implemented on a machine having at least one processor, storage, and a communication platform capable of connecting to a network for providing a recommendation for subscribing to or unsubscribing from an electronic communication is disclosed. Actions of a user are obtained with respect to electronic communications of the user. One or more categories of the electronic communications are determined. A state of the user is determined based on the actions and the one or more categories. The state is either a discovery state indicating that the user expresses an interest to receive electronic communications associated with a specific category or a cleaning state indicating that the user lacks an interest in one or more received electronic communications. A subscribe recommendation for subscribing to electronic communications associated with the specific category is provided when the state is determined to be a discovery state. An unsubscribe recommendation for unsubscribing from electronic communications similar to the one or more received electronic communications is provided when the state is determined to be a cleaning state.

In another example, a system having at least one processor, storage, and a communication platform connected to a network for providing a recommendation for subscribing to or unsubscribing from an electronic communication is disclosed. The system comprises: a user action collector configured for obtaining actions of a user with respect to electronic communications of the user; a message category extractor configured for determining one or more categories of the electronic communications; a user state determiner configured for determining a state of the user based on the actions and the one or more categories, wherein the state is either a discovery state indicating that the user expresses an interest to receive electronic communications associated with a specific category or a cleaning state indicating that the user lacks an interest in one or more received electronic communications; a subscribe recommender configured for providing a subscribe recommendation for subscribing to electronic communications associated with the specific category when the state is determined to be a discovery state; and an unsubscribe recommender configured for providing an unsubscribe recommendation for unsubscribing from electronic communications similar to the one or more received electronic communications when the state is determined to be a cleaning state.

Other concepts relate to software for implementing the present teaching on providing a recommendation for subscribing to or unsubscribing from an electronic communication. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In a different example, a non-transitory machine-readable medium having information recorded thereon for providing a recommendation for subscribing to or unsubscribing from an electronic communication is disclosed. The information, when read by the machine, causes the machine to perform the following: obtaining actions of a user with respect to electronic communications of the user; determining one or more categories of the electronic communications; determining a state of the user based on the actions and the one or more categories, wherein the state is either a discovery state indicating that the user expresses an interest to receive electronic communications associated with a specific category or a cleaning state indicating that the user lacks an interest in one or more received electronic communications; providing a subscribe recommendation for subscribing to electronic communications associated with the specific category when the state is determined to be a discovery state; and providing an unsubscribe recommendation for unsubscribing from electronic communications similar to the one or more received electronic communications when the state is determined to be a cleaning state.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
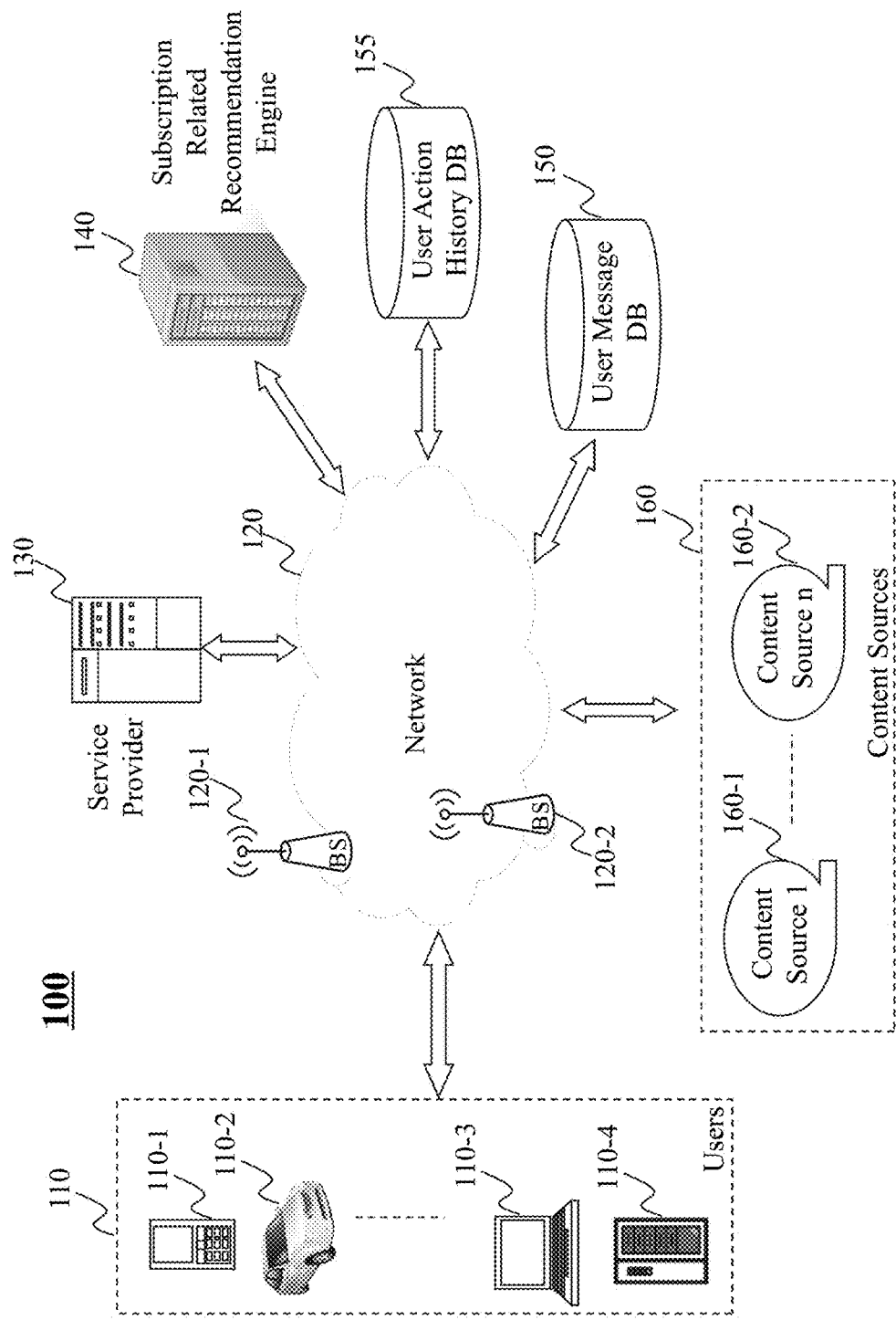
FIG. 1 is a high level depiction of an exemplary networked environment for providing subscribe and unsubscribe recommendations to users, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficiently and effectively providing a recommendation for subscribing to or unsubscribing from an electronic communication. The method and system as disclosed herein aim at improving user experience on Internet services like email or other list-based electronic communications that involve subscribe and unsubscribe operations.

With the increase of machine generated mail messages, which comprises more than 90% of today's web mail traffic, a user has a limited control over the emails that end up in his/her inbox. This can result in two opposite scenarios. First, there may be a large amount of machine generated messages sent regularly, that are irrelevant to the user and that the user would rather not receive, e.g. newsletters sent as a result of auto-subscription or updates from mailing lists that have become irrelevant. Second, the user may be interested in more updates or merchant offers related to a certain field of interest, but does not know precisely how to get them, e.g. promotions or coupons that the user would like to get in case they are related to an upcoming activity/ purchase the user is planning. While existing methods focus on supporting an unsubscribe operation, the present teaching focuses on an identification of the user state and on providing personalized recommendations about subscribe/unsubscribe for the user to make to a final decision on subscribe/ unsubscribe.

One goal of the present teaching is to enhance user's control over the emails sent to her. According to the two scenarios mentioned above, this can be done it two ways: preventing the reception of irrelevant messages, or increasing the traffic sent to the user in her fields of interest. These two scenarios may be treated via unsubscriptions or subscriptions respectively from/to relevant mailing lists. Specifically, according to one embodiment, the present teaching discloses a novel personalized recommendation system that offers to either unsubscribe from unwanted mailing lists, or to add subscriptions to new relevant lists. The disclosed system in the present teaching may choose the timing and the nature of the recommendation (unsubscribe/subscribe) depending on the user's state, which can be detected automatically. The identification of the user's state aims to determine if at the current point in time, the user is more interested in canceling undesirable traffic or acquiring more traffic of some type.

The disclosed system can assist a user in cleaning her inbox, e.g. by presenting the user recommendations of unsubscribe operations. Using such recommendations, the system will save the user efforts of identifying unwanted emails and retrieving unsubscribe links from them, as these links are often difficult to find manually. The disclosed system can also assist the user in acquiring more traffic in her fields of interest, e.g. by presenting the user recommendations for subscriptions.

In addition, the disclosed system can provide support for either unsubscribe or subscribe recommendation based on an automated detection of the state of the user. User's satisfaction from system-provided recommendations (e.g., subscribe/unsubscribe) may depend on the timing at which these recommendations are offered. For example, a user cleaning up her inbox from unwanted subscriptions is unlikely to welcome suggestions to subscribe to other mailing lists. Instead, a recommendation to unsubscribe from potentially irrelevant mailing lists is likely to enhance user experience and be positively received.

For both subscribe/unsubscribe recommendations, the disclosed system can recommend actions that are based on mail data, but are not native to mail; while examples of native actions integral to the mail system are read, reply, delete, etc. As such, the system can identify entities on which such actions can be performed, to guarantee they can be supported by the system. The recommendations presented to the user may be personalized and ranked by importance.

The disclosed method may include two phases: an online phase that provides the identification of user state to infer the action that the user might be willing to perform; and an offline phase that provides the classification of emails into different categories and assigns two types of personalized recommendations: (1) unsubscribe recommendation for the cleaning state and (2) subscribe recommendation for the discovery state. In one embodiment, once the state of the user is identified to be a discovery/cleaning state, the disclosed system can provide timely personalized recommendation of subscribe/unsubscribe operations accordingly.

For unsubscribe recommendations, the system can fetch unsubscribe links with respect to each unsubscribable entity recommended to the user. The support of the system may be guaranteed for completing the operation, in case it is chosen by the user. As such, the user no longer has to search for unsubscribe links that are often hard to find to stop unwanted traffic. The amount of unwanted traffic (unwanted mailing lists) sent to the user is thus reduced.

For subscribe recommendations, the discovery state may be associated with a more specific class, according to a current interest of the user, e.g., coupons, deals, newsletters, or even deals related to a specific field of interest. The user can be provided an option of receiving additional traffic in the context of her discovery category, if desired. In addition, the system provides a method of monetization, because subscription recommendations may establish a new advertisement mechanism that can be leveraged by retailers interested in increasing the number of their subscribers.

The terms "sub recommendation", "subscribe recommendation" and "subscription recommendation" may be used interchangeably herein. The terms "unsub recommendation", "unsubscribe recommendation" and "unsubscription recommendation" may be used interchangeably herein. The terms "subscribe/unsubscribe" and "subscribe or unsubscribe" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for providing subscribe and unsubscribe recommendations to users, according to an embodiment of the present teaching. In FIG. 1, the exemplary networked environment 100 includes one or more users 110, a network 120, a service provider 130, a subscription related recommendation engine 140, a user message database 150, a user action history database 155, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the service provider 130 and the subscription related recommendation engine 140 through wired or wireless technologies and related operating systems implemented within user-wearable devices (e.g., glasses, wrist watch, etc.).

A user, e.g., the user 110-1, may receive services related to electronic communications from the service provider 130 via the network 120. The electronic communications may include emails, text messages, or any other list-based communications. The user can subscribe to or unsubscribe from any list-based communication via the service provider 130, based on a recommendation generated by the subscription related recommendation engine 140.

The service provider 130 and the subscription related recommendation engine 140 may access information stored in the user action history database 155 and the user message database 150 via the network 120. The information in the user action history database 155 and the user message database 150 may be generated by one or more different applications (not shown), which may be running on or at the backend of the service provider 130 or the subscription related recommendation engine 140, or as a completely standalone system capable of connecting to the network 120, accessing information from different sources, analyzing the information, generating structured information, and storing such generated information in the user action history database 155 and the user message database 150.

The user message database 150 may include messages, which are potentially subject to subscribe or unsubscribe, of users based on the service provided by the service provider 130. For example, the user message database 150 may store a list of messages received by each user, a list of messages sent by each user, a list of messages marked by each user as important, trash, spam, etc. Each list may be stored in association with a corresponding user profile of a user.

The user action history database 155 may include historical actions of users with respect to messages of the users. For example, the actions may include open a message, delete a message, mark a message, forward a message, as well as information about dwell time when reading a message, etc.

Each action may be stored in association with a corresponding user profile of a user, a corresponding message profile of the message, and other contextual information like time, date, etc.

The subscription related recommendation engine 140 may generate a subscribe recommendation or unsubscribe recommendation for a user based on messages of the user and user actions of the user with respect to the messages. The subscription related recommendation engine 140 can determine a user state of the user based on the actions. In one embodiment, the user state may be either a discovery state indicating that the user intends to receive some electronic communications or a cleaning state indicating that the user intends to clean some electronic communications. Based on the determination of the user state, the subscription related recommendation engine 140 can provide a recommendation for subscribing to a first set of electronic communications when the user state is determined to be a discovery state; and provide a recommendation for unsubscribing from a second set of electronic communications when the state is determined to be a cleaning state.

The content sources 160 in the exemplary networked environment 100 include multiple content sources 160-1 . . . 160-2. A content source 160 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The service provider 130 may access information from any of the content sources 160-1 . . . 160-2. For example, the service provider 130 may fetch content through its web crawler to build a search index.

Figure 2:
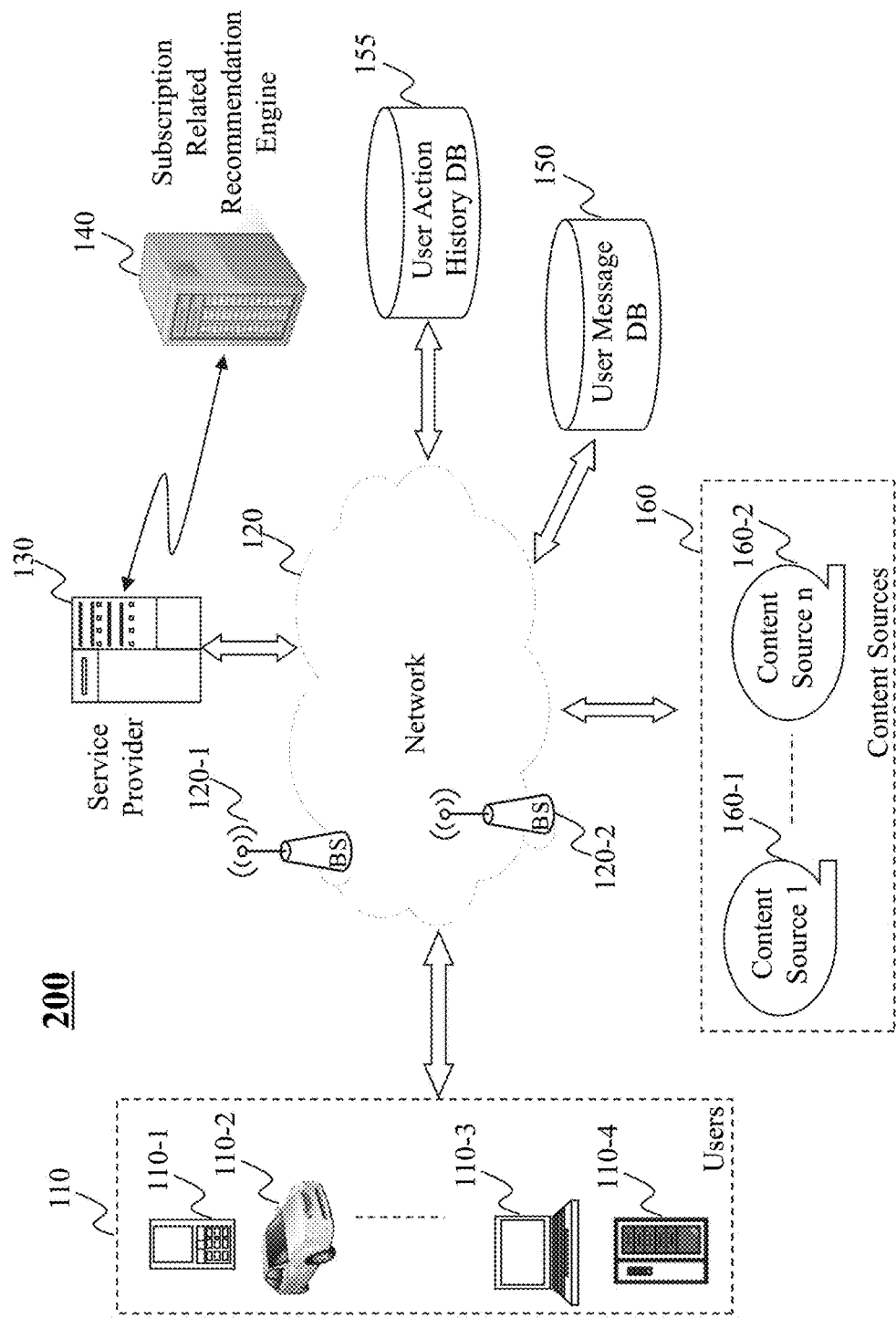
FIG. 2 is a high level depiction of another exemplary networked environment for providing subscribe and unsubscribe recommendations to users, according to an embodiment of the present teaching.

FIG. 2 is a high level depiction of another exemplary networked environment 200 for providing subscribe and unsubscribe recommendations to users, according to an embodiment of the present teaching. The exemplary networked environment 200 in this embodiment is similar to the exemplary networked environment 100 in FIG. 1, except that the subscription related recommendation engine 140 serves as a backend system for the service provider 130.

Figure 3:
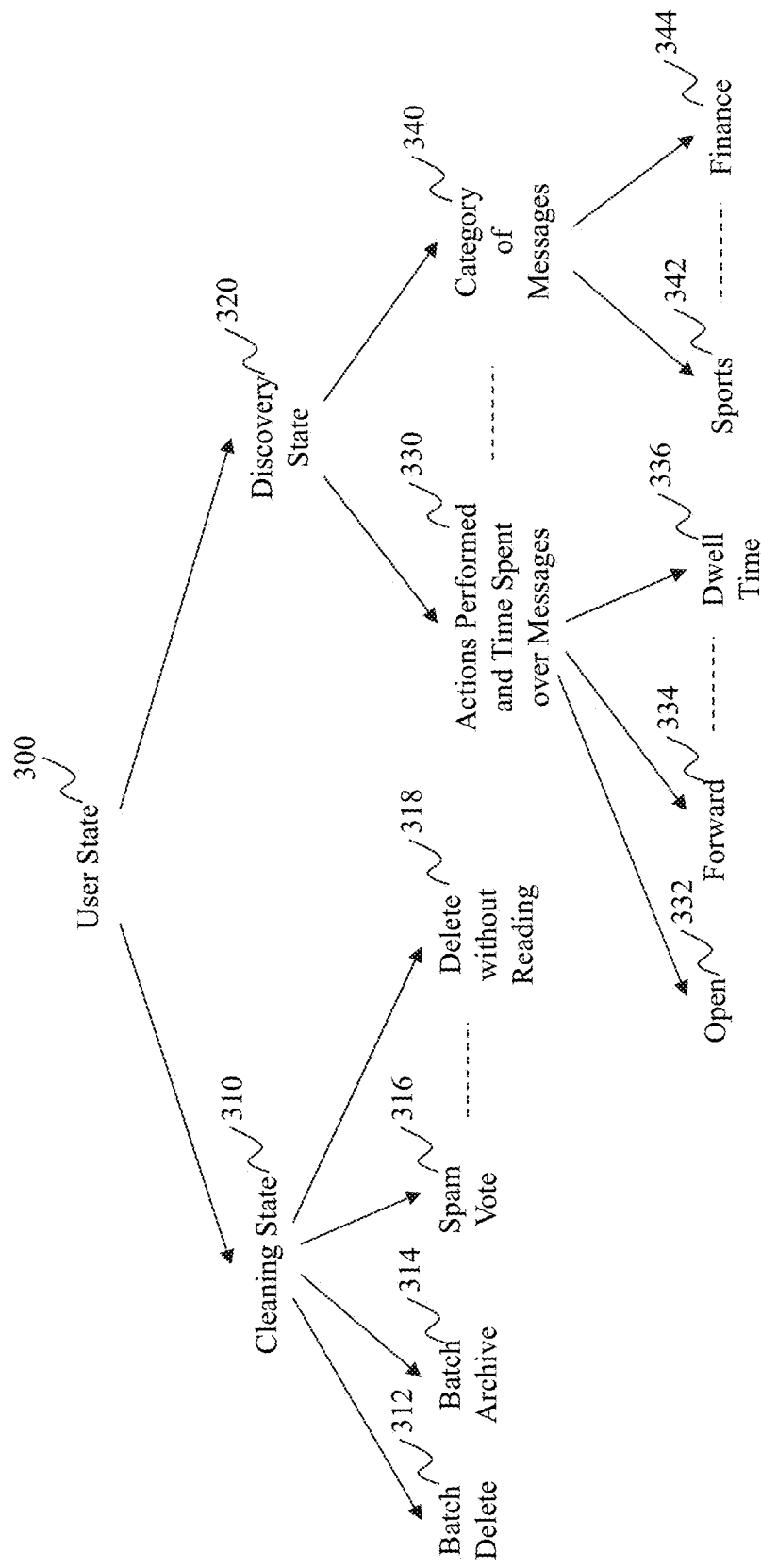
FIG. 3 illustrates exemplary signals related to user states, according to an embodiment of the present teaching.

FIG. 3 illustrates exemplary signals related to user states, according to an embodiment of the present teaching. As shown in FIG. 3, a user state 300 may be either a cleaning state 310 or a discovery state 320. In one embodiment, a cleaning state of a user means that the user wants to clean her inbox from messages in which she is not interested in anymore. Signals for such a cleaning state may include but not limited to: batch delete 312, batch archive 314, spam vote 316, delete without reading 318, and a raw unsubscription when a user clicks an unsub link in a message (not shown). In one embodiment, a discovery state of a user describes a situation where the user is interested in acquiring information, either new information or existing information she re-iterates on. This discovery state can be detected based on two types of signals: (1) the category of the messages 340, and (2) actions performed and time spent over the messages 330, e.g. open 332, forward 334, read dwell time 336, or clicks on links in the messages, print, etc. A discovery state can be detected when some of the actions mentioned above are performed on messages of a predefined category. Hence, identification of the discovery state may be based on the message classification, to be discussed in detail later.

Figure 4:
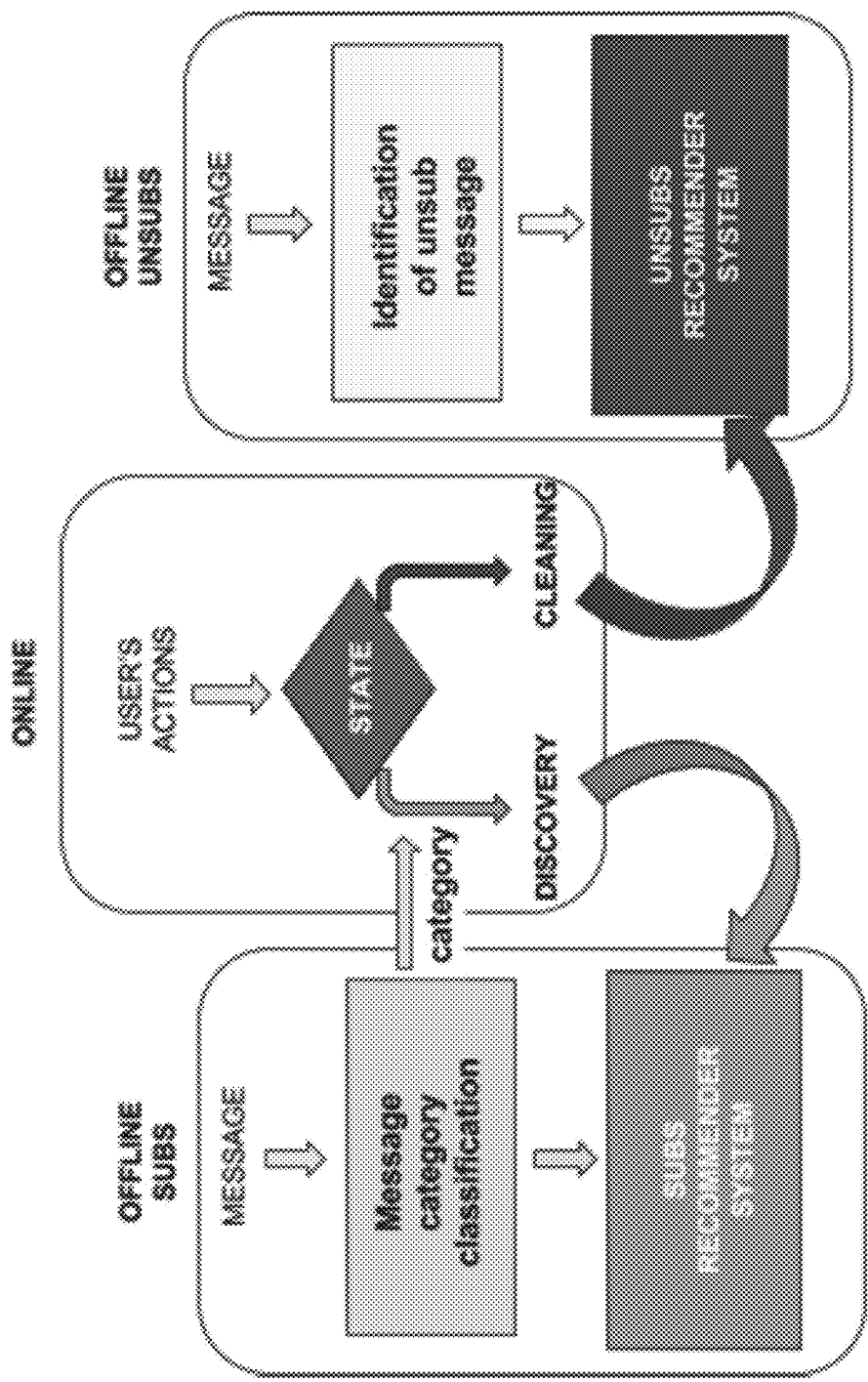
FIG. 4 shows an exemplary schematic view for a system of providing subscribe and unsubscribe recommendations to users, according to an embodiment of the present teaching.

FIG. 4 shows an exemplary schematic view for a system for providing subscribe and unsubscribe recommendations to users, according to an embodiment of the present teaching. As shown in FIG. 4, the disclosed method may include two phases: an online phase that provides the identification of user state to infer the action that the user might be willing to perform; and an offline phase that provides the classification of emails into different categories and assigns two types of personalized recommendations: (1) unsubscribe recommendation for the cleaning state and (2) subscribe recommendation for the discovery state. FIG. 4 schematically illustrates the interaction between these two phases.

The online phase is for identifying a user state of a user. In this phase, the system can identify the user's state based on a few of her recent actions. Specifically, it may continuously check the last p actions of the user, where p is some predefined number, and infer the user's current state based on the nature of these actions and the category of the messages on which these actions were performed.

As discussed above, there are two main types of user's state, namely, cleaning state and discovery state. A cleaning state means that the user wants to clean her inbox from messages in which she is not interested in anymore. Signals for such a cleaning state may include batch delete, batch archive, spam vote, delete without reading, etc. A discovery state of a user describes a situation where the user is interested in acquiring information, either new information or existing information she re-iterates on. This discovery state can be detected based on two types of signals: (1) the category of the messages, and (2) actions performed and time spent over the messages, e.g. open, forward, read dwell time, clicks on links in the messages, print, etc. A discovery state can be detected when some of the actions mentioned above are performed on messages of a predefined category. Hence, identification of the discovery state may be based on the message classification.

The offline phase for unsubscriptions of the system can be divided into two main sub-phases: a first sub-phase about identification of unsubscribable messages; and a second sub-phase about generation of unsubscribe recommendation (unsubs) based on e.g. machine learning or a heuristic method.

During the first sub-phase, unsubscribable messages are identified, because the messages which correspond to the cleaning state should be unsubscribable, i.e., should contain a link for unsubscription. The unsubscribe link can be extracted either from the header of the message ("List-Unsubscribe" header) or from the body of the message (e.g., HTML hyperlinks that contain words like "unsubscribe" or "opt-out" in different languages).

During the second sub-phase for generating unsubscribe recommendations, the recommendations may be based on machine learning techniques that analyze user's activity and the inbox content as well as the global popularity of senders that send unsubscribable messages. More specifically, given a pair (user U, sender S), one can generate a feature vector that includes two types of features: (i) the local features extracted from the personal inbox of U and (ii) the global features for S that are extracted from the entire mail dataset. The local features may reflect the past user behavior related to the sender's messages as well as statistical data collected from the messages sent by S to U. Examples of such features include the overall number of messages from S to U, the number of deleted messages and the average subject length in the messages from S to U. The global features may reflect the popularity of the senders, and include, for example, the overall number of recipients with which a sender corresponds, or the number of clicks on unsubscribe-links over all the sender's messages.

The machine learning model may be trained on data generated for pairs of (user U, sender S). Each such pair may be represented by its vector of features, and get a binary label that indicates if user U ever clicked on an unsubscribe link in a message she got from S. A model can then be generated for predicting unsubscriptions per user and sender. More specifically, a score can be assigned to each pair (user U, sender S), where the score represents a prediction for the probability that user U unsubscribes from sender S. Note that additional user feedback such as user interaction with the recommended unsubscriptions (clicks and skips) may be included in the learning process.

For every user U, a ranked list of senders and unsubscribe links can be created. The list may include senders ordered by their respective scores; together with their respective unsubscribe links. The top few elements of this list may be shown to the user as recommended unsubscriptions. Here, a sender can be identified by its SMTP address, by a sender-name, or by a combination of <sender-SMTP, sender-name>. For example, there could be senders with multiple different names, while each message is associated with a single <sender-SMTP, sender-name> pair.

The offline phase for subscriptions of the system can be divided into two main sub-phases: a first sub-phase about classification of the messages into different categories that correspond to the discovery state; and a second sub-phase about generation of subscribe recommendation (subs) using machine learning.

During the first sub-phase, messages are classified, as there are different categories of messages that could potentially correspond to a discovery state. One example is messages that contain coupons, deals and special offers. One can refer to this class of messages as shopping. Another example is news, which includes messages that contain news items, blog posts updates and editorials. The classification of messages can be performed in various ways, including machine learning. Various features can be collected per message, including features that are based on the subject and the content, and a model may be built based on a labeled set of messages. A message might be categorized to multiple categories simultaneously. When a message arrives, the inferred category (or categories) can be added to its metadata.

During the first sub-phase for generation of subscribe recommendation, the subscribe recommendations may rely on an existing set of popular mailing lists that can be proposed to the user. Depending on the category of subscriptions (shopping, news, etc.), this set can be gathered in different ways. For example, for shopping, it can be provided by retailers that have a clear interest in publishing deals and offers. It can also rely on a manual analysis of popular mailing lists. Given such lists of subscribe links, personalized recommendations for subscriptions may be created by the disclosed system based on a machine learning model.

Recommending candidate senders to users may be achieved by any Learning-to-Rank approach. A selected approach should support cold-start scenarios of users with fewer subscriptions and senders with fewer subscribed users as will be described below.

In one embodiment, model entities which include users and senders, may be represented by latent factor vectors of dimension d (typically between 10-100), $V_U$ and $V_S$, respectively. The model parameters can be learnt using a snapshot of the subscription matrix, where its (U,S) entry equals 1 if user U is subscribed to sender S and zero otherwise. In particular, one can minimize the cost function that sums up the $-\log(\text{sigmoid}(P_{U,S}-P_{U,S'}))$ values of all non-zero (U,S) entries, where $$\text{sigmoid}(x)=1/(1+\exp(-x)), P_{U,S}=V_U \cdot V_S \text{ and}$$
$$P_{U,S'}=Vu \cdot V_{S'},$$

and "·" denotes a dot product between two equal sized vectors. The "negative" sender S' is drawn uniformly over all senders the user U is not subscribed to. The minimization may be achieved by a stochastic gradient descent (SGD) algorithm with L2 regularization to avoid overfitting. Recommendations for user U can be done by ranking $P_{U,S}$ for all senders, while removing senders already listed to user U. In particular, for every user U, the system can create the list of subscription entities together with the subscription links ordered by their scores. The top few elements of this list that belong to the specific class associated with the discovery state (purchases, news, etc.) may be shown to the user as recommended subscriptions.

The described procedure may be used to recommend senders to users who are subscribed to more than a predefined number of senders (e.g., 10). Recommendation to users with fewer senders may be done according to categorized popularity (for example, the top k senders for 30-35 year old females from NY using tablets). Senders with less than a predefined number of subscribed users (e.g., 10) may be included in the model but are not recommended to users. To support ongoing operation, learning may be done periodically in an incremental fashion where the previous model is used as the initial model for the current learning phase.

To handle cold-start scenarios, the system can learn a mapping (e.g., linear mapping) between the user feature space (e.g., age, gender, geo, device, search and browse history, etc.) or sender feature space (e.g., stats on his traffic, the overall number of recipients, the number of messages sent by the sender that triggered a specific action, topics or recurring words in his messages, etc.) and the learnt latent space. Using the mapping, one can get an initial estimate for the latent factor vectors for new users and new senders. Additional user feedback such as unsubscriptions and user interaction with the recommended subscription list (clicks and skips) may be included in the learning processes as negative and positive indications.

Figure 5:
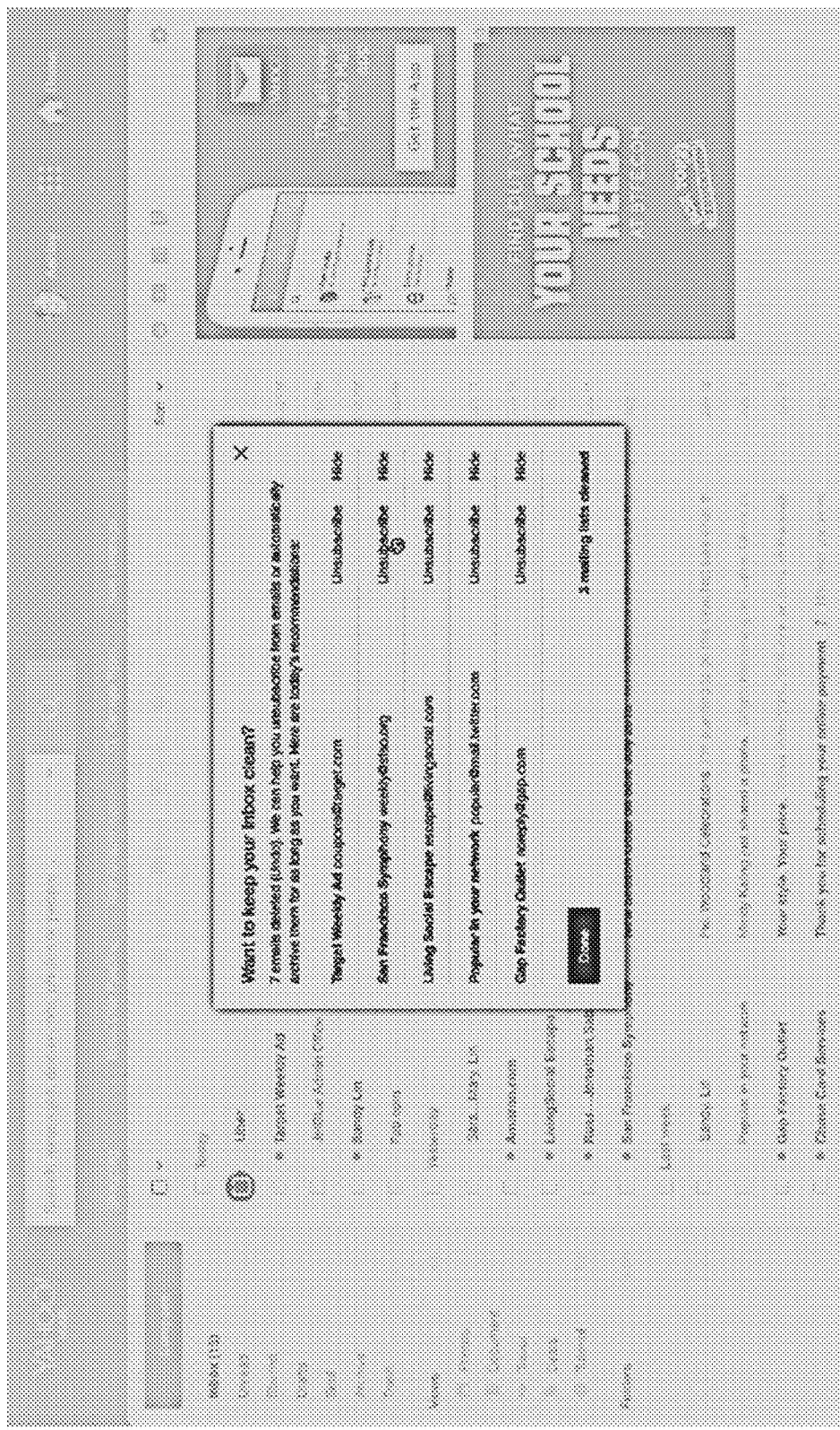
FIG. 5 shows an exemplary user interface for providing some unsubscribe recommendations to a user, according to an embodiment of the present teaching.

FIG. 5 shows an exemplary user interface for providing some unsubscribe recommendations to a user, according to an embodiment of the present teaching. As shown in FIG. 5, the user may be provided with a listed recommended links for unsubscribing. The user may choose any link to unsubscribe or hide for later consideration. This can help the user to clean her inbox with little effort from the user herself.

Figure 6:
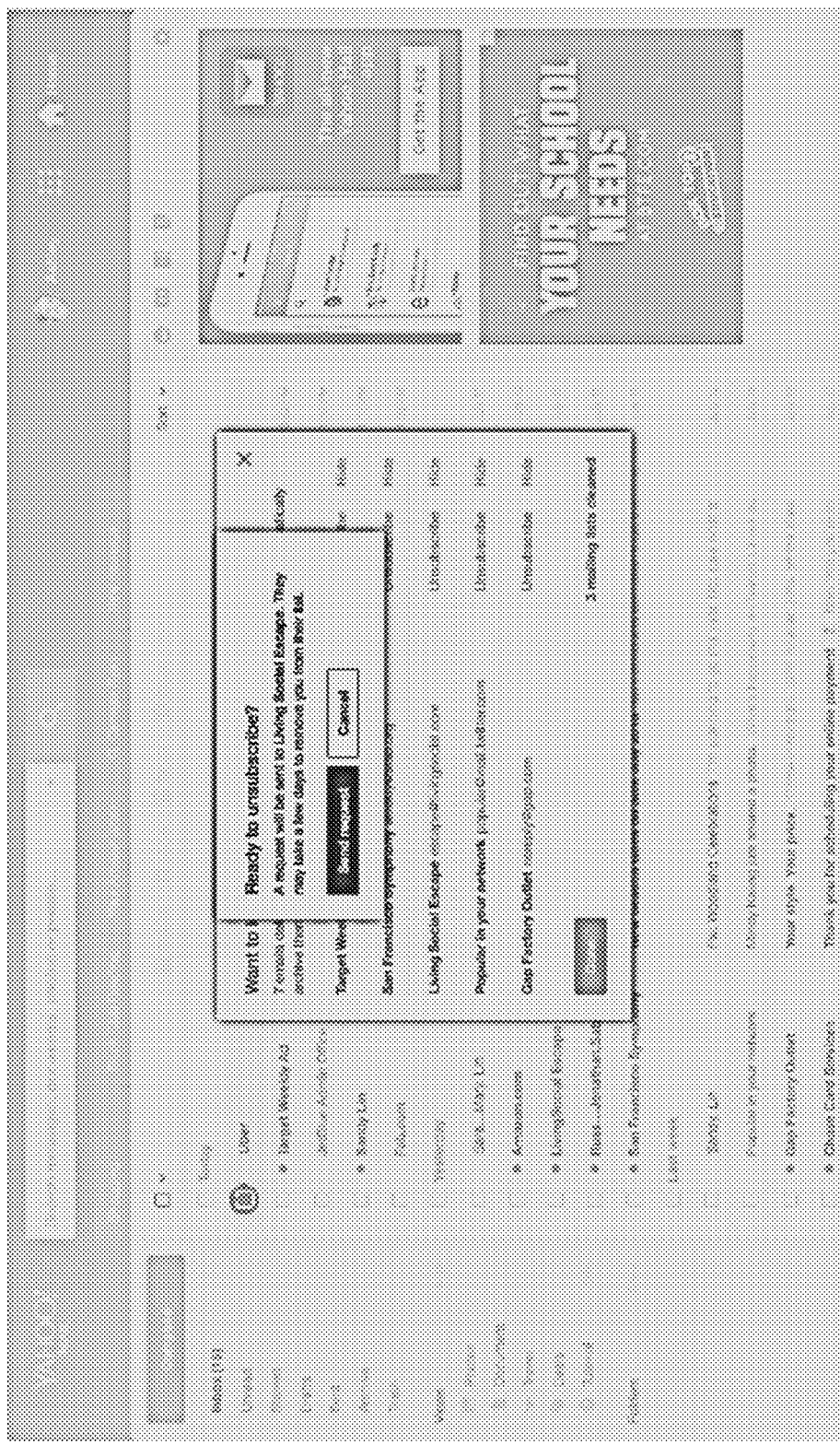
FIG. 6 shows another exemplary user interface for providing some unsubscribe recommendations to a user, according to an embodiment of the present teaching.

FIG. 6 shows another exemplary user interface for providing some unsubscribe recommendations to a user, according to an embodiment of the present teaching. As shown in FIG. 6, after the user clicks on unsubscribe, the system can provide a pop-up window asking for the user's confirmation. It can be understood that a similar user interface may be provided for providing subscribe recommendations to a user.

Figure 7:
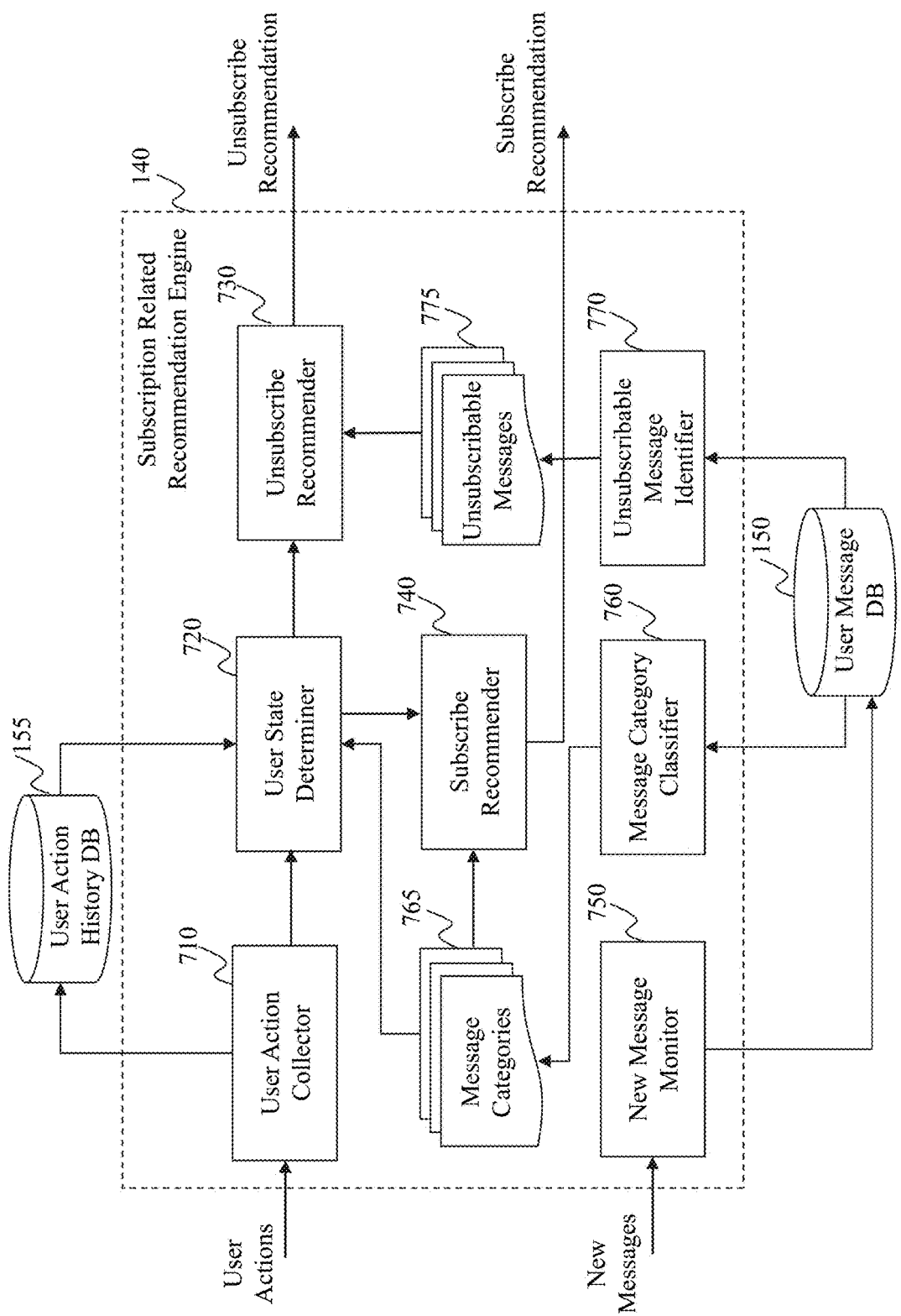
FIG. 7 illustrates an exemplary diagram of a subscription related recommendation engine, according to an embodiment of the present teaching.

FIG. 7 illustrates an exemplary diagram of a subscription related recommendation engine 140, according to an embodiment of the present teaching. The subscription related recommendation engine 140 in this example includes a user action collector 710, a user state determiner 720, an unsubscribe recommender 730, a subscribe recommender 740, a new message monitor 750, a message category classifier 760, one or more message categories 765, an unsubscribable message identifier 770, and one or more unsubscribable messages 775.

The user action collector 710 in this example may collect user actions of a user, either from the service provider 130 or directly from the user. In one embodiment, the user action collector 710 may store all of collected user actions into the user action history database 155, together with information about the user and messages related to the actions, which may be performed offline. In another embodiment, the user action collector 710 may collect the recently happened user actions of a user and send them to the user state determiner 720 for determining a user state of the user.

The user state determiner 720 in this example may receive the recently happened user actions of the user and determine a user state of the user based on the recently received user actions of the user. In one embodiment, the user state determiner 720 may also utilize some user action history of the user to determine the user state.

As discussed above, the user state may be either a cleaning state or a discovery state. When the user state determiner 720 determines that the user is in a cleaning state, the user state determiner 720 may send an unsubscribe recommendation request to the unsubscribe recommender 730 for generating an unsubscribe recommendation. When the user state determiner 720 determines that the user is in a discovery state, the user state determiner 720 may send a subscribe recommendation request to the subscribe recommender 740 for generating a subscribe recommendation. In one embodiment, the subscribe recommendation request may be generated based on a category of the messages to be recommended for subscribing.

The unsubscribe recommender 730 in this example may receive an unsubscribe recommendation request from the user state determiner 720, generate an unsubscribe recommendation based on the request, and provide the unsubscribe recommendation to the user. In one embodiment, the unsubscribe recommender 730 may generate an unsubscribe recommendation by determining whether a message related to the user's cleaning state is unsubscribable or not, e.g. whether the message includes an unsubscribe link or whether the message is from a sender that provides an option for unsubscribe. If yes, this message may be included in the recommended unsubscription list. It can understood that unsub recommendations are not necessarily based on the current message, but may be only based on the state of the user (e.g. based on a batch delete operation from the user). In addition, unsubs being presented do not necessarily include the current entity.

The subscribe recommender 740 in this example may receive a subscribe recommendation request from the user state determiner 720, generate a subscribe recommendation based on the request, and provide the subscribe recommendation to the user. In one embodiment, the subscribe recommender 740 may generate a subscribe recommendation based on categories of the messages related to the user's discovery state, e.g. based on whether a category to be recommended is preferred by the user or has been rejected by the user before, or based on the category of the message itself. In another embodiment, the subscribe recommendation generated by the subscribe recommender 740 includes information about the categories of the messages to be recommended for subscribing, e.g. information about subscriptions to mailing lists.

The new message monitor 750 in this example may monitor and obtain new messages related to users, e.g. messages sent to users, messages sent by users, messages deleted by users, etc. The new message monitor 750 may store these user messages into the user message database 150.

The message category classifier 760 in this example may take the user messages from the user message database 150 and classify the user messages into various categories. This may be performed offline, e.g. once in a while for updating the various categories of messages. The message category classifier 760 may then store the classified categories into the message categories 765 for utilization of the user state determiner 720 and the subscribe recommender 740 during an online phase.

The unsubscribable message identifier 770 in this example may take the user messages from the user message database 150, identify unsubscribable messages among them, and store these unsubscribable messages 775. This may be performed offline, e.g. once in a while for updating the unsubscribable messages 775, storing unsubscribable entities (e.g. senders, or tuples of the form <sender, name>), all of which may be utilized by the unsubscribe recommender 730 during an online phase.

Figure 8:
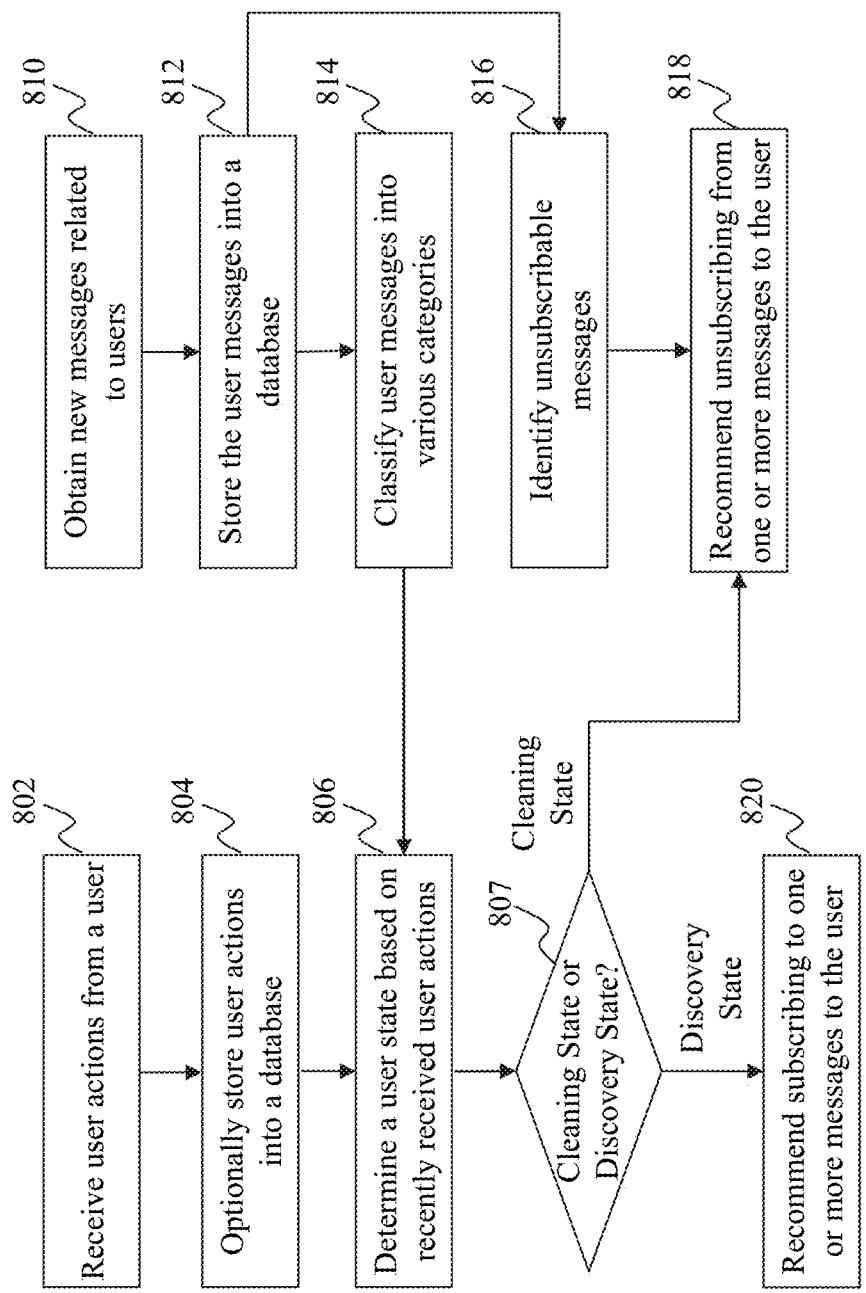
FIG. 8 is a flowchart of an exemplary process performed by a subscription related recommendation engine, according to an embodiment of the present teaching.

FIG. 8 is a flowchart of an exemplary process performed by a subscription related recommendation engine, e.g. the subscription related recommendation engine 140 in FIG. 7, according to an embodiment of the present teaching. As shown in FIG. 8, user actions are received at 802 from a user. User actions are optionally stored at 804 into a database. At 806, a user state is determined based on recently received user actions.

At 807, it is determined that whether the user state is a cleaning state or a discovery state. If it is a cleaning state, the process goes to 818 to recommend to the user unsubscribing from one or more messages. If it is a discovery state, the process goes to 820 to recommend to the user subscribing to one or more messages, e.g. one or more mailing lists.

It can be understood that other steps 810-816 may be performed offline. For example, new messages related to users may be obtained at 810. The user messages are stored at 812 into a database. At 814, user messages are classified into various categories. Unsubscribable messages are identified at 816.

Figure 9:
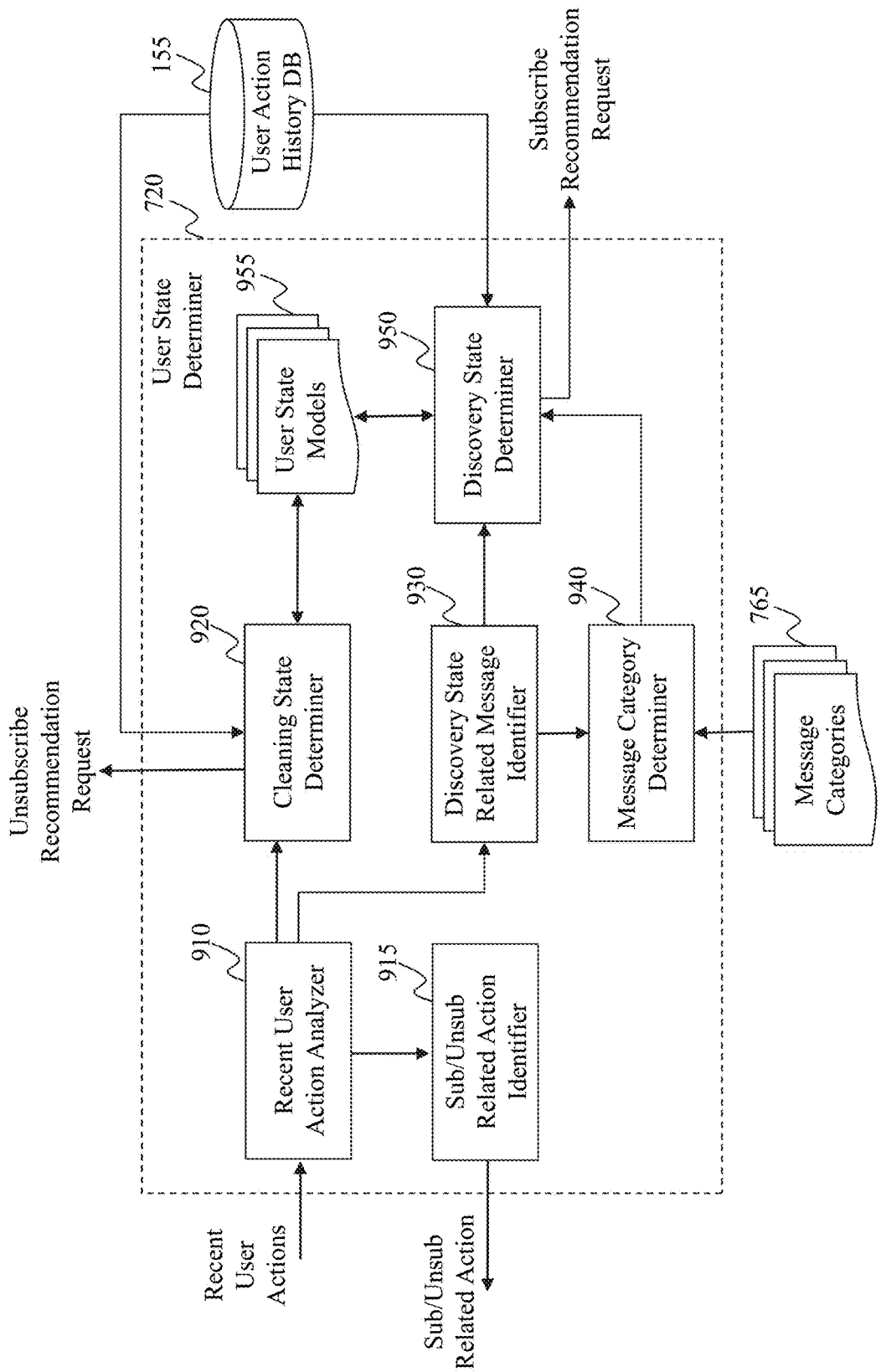
FIG. 9 illustrates an exemplary diagram of a user state determiner, according to an embodiment of the present teaching.

FIG. 9 illustrates an exemplary diagram of a user state determiner 720, according to an embodiment of the present teaching. As shown FIG. 9, the user state determiner 720 in this example includes a recent user action analyzer 910, a sub/unsub related action identifier 915, a cleaning state determiner 920, a discovery state related message identifier 930, a message category determiner 940, a discovery state determiner 950, and one or more user state models 955.

The recent user action analyzer 910 in this example may receive and analyze recent user actions of a user. Based on the analysis, the recent user action analyzer 910 may send the analyzed recent user actions to the sub/unsub related action identifier 915 for identifying sub/unsub related actions, to the cleaning state determiner 920 for determining a cleaning state, and/or to the discovery state related message identifier 930 for identifying discovery state related messages.

The sub/unsub related action identifier 915 in this example may receive the analyzed recent user actions from the recent user action analyzer 910 and identify sub/unsub related user actions. For example, the sub/unsub related user actions may include a user's action in response to a previous recommendation from the subscription related recommendation engine 140. The sub/unsub related action identifier 915 may send the sub/unsub related user actions to the unsubscribe recommender 730 and the subscribe recommender 740 for determining user feedbacks.

The cleaning state determiner 920 in this example may receive the analyzed recent user actions of a user from the recent user action analyzer 910 and determine a cleaning state of the user based on a trained model and the recent user actions of the user. The cleaning state determiner 920 may retrieve one of the user state models 955 and utilize the retrieved model to determine the cleaning state. In one embodiment, the cleaning state determiner 920 may update one of the user state models 955, based on some recent user actions. In another embodiment, the cleaning state determiner 920 may retrieve user action history of the user from the user action history database 155, and utilize the retrieved user action history to determine a cleaning state of the user. Based on the determination of the cleaning state, the cleaning state determiner 920 may generate and send an unsubscribe recommendation request to the unsubscribe recommender 730 for generating an unsubscribe recommendation.

The discovery state related message identifier 930 in this example may receive the analyzed recent user actions of a user from the recent user action analyzer 910 and identify messages related to a discovery state. The discovery state related message identifier 930 may send the identified messages to the message category determiner 940 for determining message categories and to the discovery state determiner 950 for determining a discovery state.

The message category determiner 940 in this example may receive the identified messages from the discovery state related message identifier 930 and determine or obtain a category for each of the identified messages, based on the stored message categories 765. In one embodiment, while the message categories 765 may be updated offline, the message category determiner 940 may determine the category for each identified message online. The message category determiner 940 may send the determined category information to the discovery state determiner 950 for determining a discovery state.

The discovery state determiner 950 in this example may receive the identified messages from the discovery state related message identifier 930 and receive the determined category information from the message category determiner 940. The discovery state determiner 950 may determine a discovery state based on the identified messages and the determined category information, according to one of the user state models 955. In one embodiment, the discovery state determiner 950 may update one of the user state models 955, based on some identified messages and corresponding category information. In another embodiment, the discovery state determiner 950 may retrieve user action history of the user from the user action history database 155, and utilize the retrieved user action history to determine a discovery state of the user. Based on the determination of the discovery state, the discovery state determiner 950 may generate and send a subscribe recommendation request to the subscribe recommender 740 for generating a subscribe recommendation, in accordance with the identified messages and corresponding categories.

Figure 10:
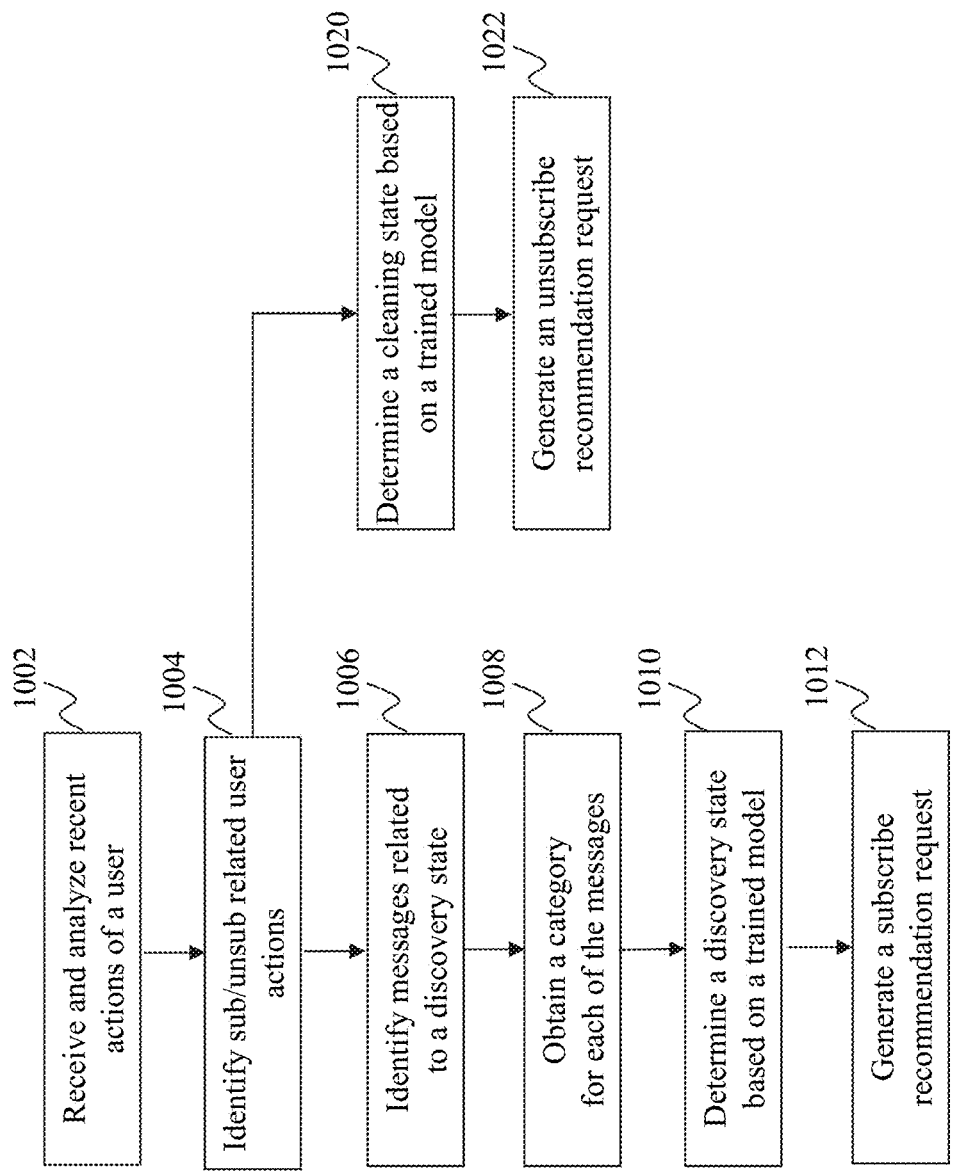
FIG. 10 is a flowchart of an exemplary process performed by a user state determiner, according to an embodiment of the present teaching.

FIG. 10 is a flowchart of an exemplary process performed by a user state determiner, e.g. the user state determiner 720 in FIG. 9, according to an embodiment of the present teaching. As shown in FIG. 10, recent actions of a user are received and analyzed at 1002. Sub/unsub related user actions are identified at 1004.

Messages related to a discovery state are identified at 1006. A category is obtained at 1008 for each of the messages. A discovery state is determined at 1010 based on a trained model. A subscribe recommendation request is generated at 1012. In one embodiment, in parallel to steps 1006-1012, the process may include steps 1020-1022, where a cleaning state may be determined at 1020 based on a trained model, and an unsubscribe recommendation request is generated at 1022.

Figure 11:
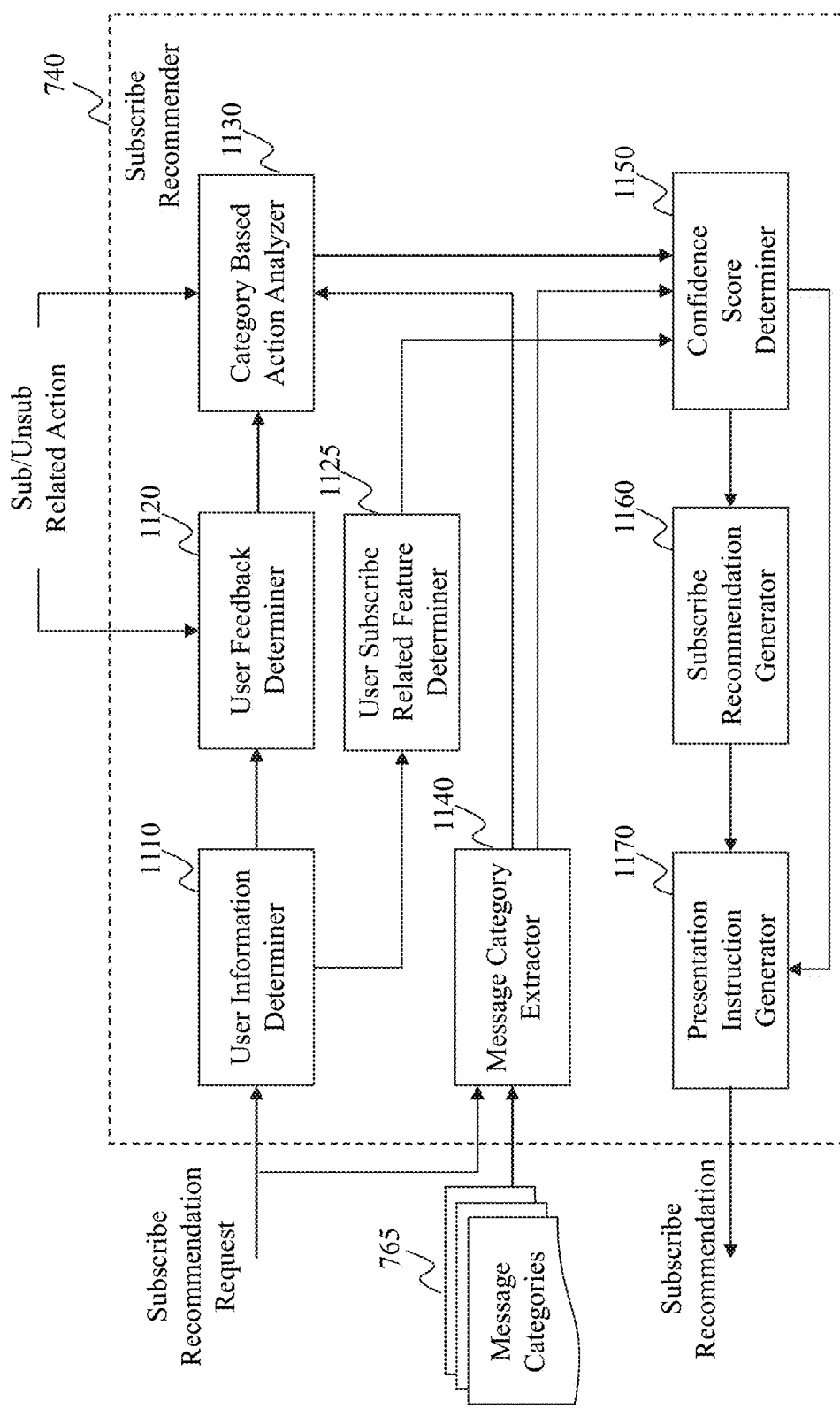
FIG. 11 illustrates an exemplary diagram of a subscribe recommender, according to an embodiment of the present teaching.

FIG. 11 illustrates an exemplary diagram of a subscribe recommender 740, according to an embodiment of the present teaching. As shown in FIG. 11, the subscribe recommender 740 in this example includes a user information determiner 1110, a user feedback determiner 1120, a user subscribe related feature determiner 1125, a category based action analyzer 1130, a message category extractor 1140, a confidence score determiner 1150, a subscribe recommendation generator 1160, and a presentation instruction generator 1170.

The user information determiner 1110 in this example may receive a subscribe recommendation request related to a user, e.g. from the user state determiner 720, and determine user information of the user based on the request. The user information may include but not limited to: personal information of the user, e.g. demographic information of the user like age, gender, location, etc., preference information like her preferred device, operating system, browser software, etc., and information about past activities (purchases, existing subs to newsletters etc.) of the user, typically extracted from mail data (by privacy preserving means), e.g. fields of interest of the user according to the past activities. The user information determiner 1110 may forward the user information as well as the subscribe recommendation request to the user feedback determiner 1120 for determining user feedback, and to the user subscribe related feature determiner 1125 for determining user subscription related features.

The user subscribe related feature determiner 1125 in this example may receive the subscribe recommendation request from the user information determiner 1110, where the request may include information about a determined discovery state of the user. Based on the information about a determined discovery state, the user subscribe related feature determiner 1125 may determine or extract all features related to user subscription, including but not limited to many features determined based on the signals shown in FIG. 3. The user subscribe related feature determiner 1125 may send the user subscription related features to the confidence score determiner 1150 for determining a confidence score for each possible subscription recommendation or each recommended subscription link.

The message category extractor 1140 in this example may also receive the subscribe recommendation request related to the user, e.g. from the user state determiner 720. The message category extractor 1140 may determine messages related to the subscribe recommendation request, and extract a category corresponding to each message based on the stored message categories 765 and the request. The message category extractor 1140 may send the information about message category to the category based action analyzer 1130 for analyzing category based user actions, and to the confidence score determiner 1150 for determining a confidence score for each possible subscription recommendation or each recommended subscription link.

The user feedback determiner 1120 in this example may receive the subscribe recommendation request from the user information determiner 1110, and receive sub/unsub related actions of the user, e.g. from the user state determiner 720. Based on the received information, the user feedback determiner 1120 may determine one or more user feedbacks from the user. For example, a user feedback from the user may be determined based on a user action of deleting or rejecting a previous subscription recommendation generated by the subscribe recommender 740. The user feedback determiner 1120 may send the determined user feedback to the category based action analyzer 1130 for analyzing category based actions.

The category based action analyzer 1130 in this example may receive a determined user feedback from the user feedback determiner 1120 regarding a user, receive information about message category from the message category extractor 1140, and receive sub/unsub related actions of the user, e.g. from the user state determiner 720. The category based action analyzer 1130 may analyze user actions of the user based on the message category, and send the analyzed user actions related to the categories to the confidence score determiner 1150 for determining a confidence score for each possible subscription recommendation or each recommended subscription link.

It can be understand that in one embodiment, the user feedback determiner 1120 and the category based action analyzer 1130 may perform offline.

The confidence score determiner 1150 in this example may receive the user subscription related features from the user subscribe related feature determiner 1125, the information about message category from the message category extractor 1140, and the analyzed user action information, which may include user feedback information, from the category based action analyzer 1130. Based on the received information, the confidence score determiner 1150 may determine possible recommended links and a confidence score for each possible recommended link. The confidence score determiner 1150 may send the possible recommended links along with their respective confidence scores to the subscribe recommendation generator 1160 for generating a list of ranked subscribe recommendations, where each subscribe recommendation is for recommending subscribing to a set of messages by following a link and is ranked according to its confidence score. The confidence score determiner 1150 may also send the possible recommended links along with their respective confidence scores to the presentation instruction generator 1170 for generating a presentation instruction.

The subscribe recommendation generator 1160 in this example may receive the possible recommended links along with their respective confidence scores from the confidence score determiner 1150, select at least some of the possible recommended links and rank them based on their respective scores. In one embodiment, the subscribe recommendation generator 1160 may first rank all possible recommended links based on their respective scores, and then select some of the possible recommended links for subscribe recommendations. The subscribe recommendation generator 1160 may then generate a ranked list of subscribe recommendations for the user and send the ranked list to the presentation instruction generator 1170 for generating a presentation instruction.

The presentation instruction generator 1170 in this example may receive the possible recommended links along with their respective confidence scores from the confidence score determiner 1150, and receive the ranked list of subscribe recommendations from the subscribe recommendation generator 1160. Based on the received information, the presentation instruction generator 1170 may generate a presentation instruction for presenting the ranked list of subscribe recommendations to the user. The presentation instruction may indicate how to present the ranked list, e.g. presenting an updated ranked list of subscribe recommendations with a certain frequency (like 3 times a day, 10 times a week); presenting the ranked list upon certain actions of the user, etc. In one embodiment, the presentation instruction may be personalized based on the information of the user, e.g. the presentation frequency may be different for different users depending on the user's action history; a ranked list of recommendations may be presented within certain time period of a day for one person, but presented within another time period of a day for another person; other parameters related to presentation, like font, size, layout of content items when presenting the subscribe recommendations, can all be personalized and/or updated based on the user's personal information and/or recent action history. The presentation instruction generator 1170 in this example may send both the ranked list of subscribe recommendations and a corresponding presentation instruction to the service provider 130 or directly to the user, such that the user can make a final decision about the subscription based on those subscribe recommendations.

Figure 12:
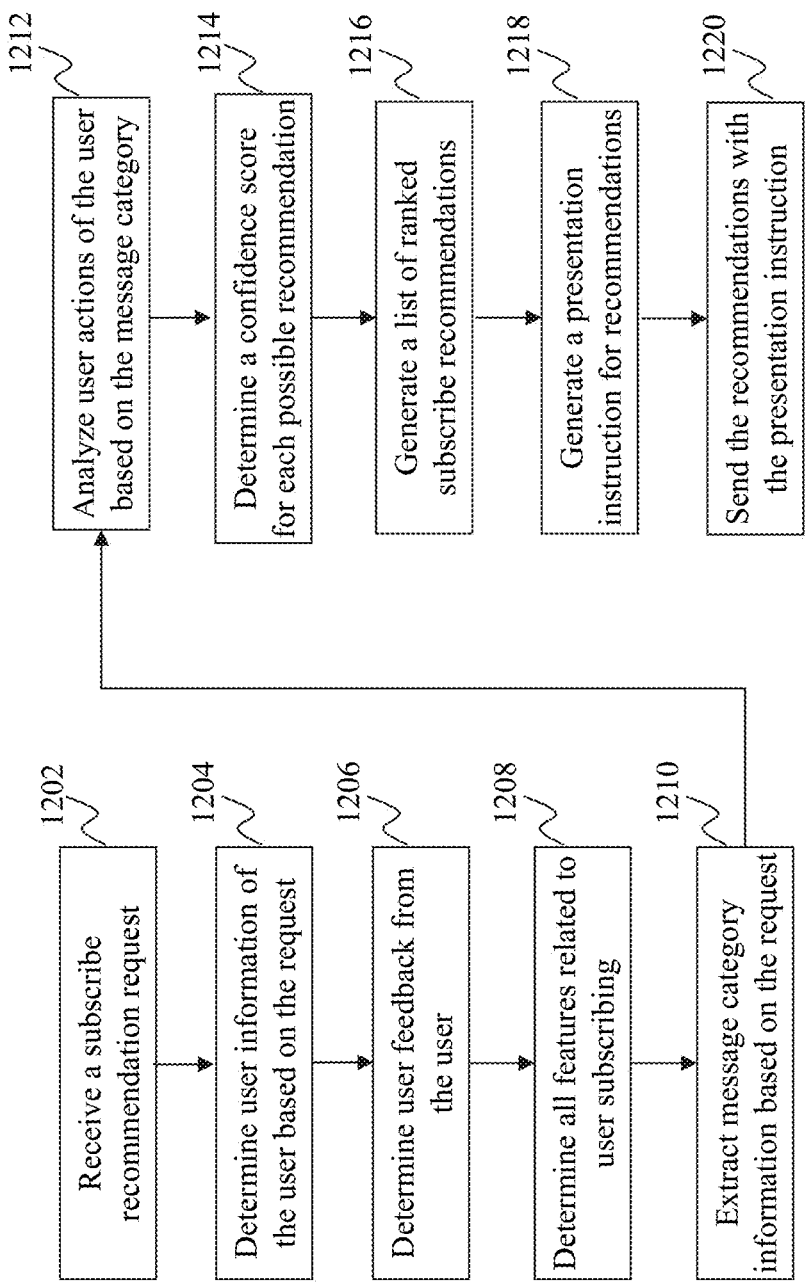
FIG. 12 is a flowchart of an exemplary process performed by a subscribe recommender, according to an embodiment of the present teaching.

FIG. 12 is a flowchart of an exemplary process performed by a subscribe recommender, e.g. the subscribe recommender 740 in FIG. 11, according to an embodiment of the present teaching. As shown in FIG. 12, a subscribe recommendation request is received at 1202. User information of the user is determined at 1204 based on the request. User feedback from the user may be determined at 1206. All features related to user subscribing can be determined at 1208. Message category information is extracted at 1210 based on the request.

User actions of the user are analyzed at 1212 based on the message category information. A confidence score is determined at 1214 for each possible recommendation. A list of ranked subscribe recommendations is generated at 1216. A presentation instruction is generated at 1218 for recommendations. The recommendations are sent at 1220 with the presentation instruction.

Figure 13:
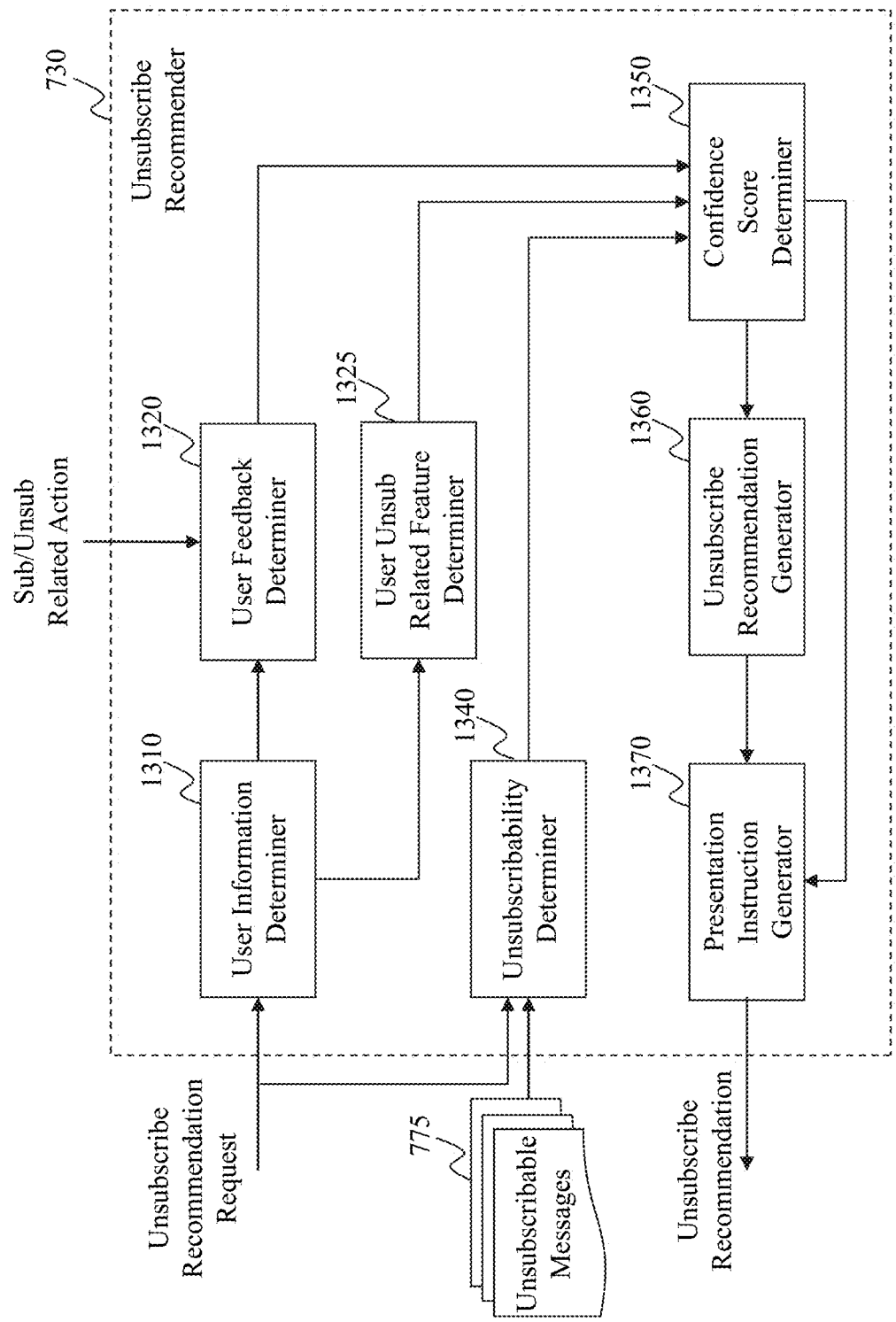
FIG. 13 illustrates an exemplary diagram of an unsubscribe recommender, according to an embodiment of the present teaching.

FIG. 13 illustrates an exemplary diagram of an unsubscribe recommender 730, according to an embodiment of the present teaching. As shown in FIG. 13, the unsubscribe recommender 730 in this example includes a user information determiner 1310, a user feedback determiner 1320, a user unsub related feature determiner 1325, an unsubscribability determiner 1340, a confidence score determiner 1350, an unsubscribe recommendation generator 1360, and a presentation instruction generator 1370.

The user information determiner 1310 in this example may receive an unsubscribe recommendation request related to a user, e.g. from the user state determiner 720, and determine user information of the user based on the request. The user information may include but not limited to: personal information of the user, e.g. demographic information of the user like age, gender, location, etc., preference information like her preferred device, operating system, browser software, etc., and information about past activities (purchases, existing subs to newsletters etc.) of the user, typically extracted from mail data (by privacy preserving means), e.g. fields of interest of the user according to the past activities. The user information determiner 1310 may forward the user information as well as the unsubscribe recommendation request to the user feedback determiner 1320 for determining user feedback, and to the user unsub related feature determiner 1325 for determining user unsub related features.

The user unsub related feature determiner 1325 in this example may receive the unsubscribe recommendation request from the user information determiner 1310, where the request may include information about a determined cleaning state of the user. Based on the information about a determined cleaning state, the user unsub related feature determiner 1325 may determine or extract all features related to user unsubscribing, including but not limited to many features determined based on the signals shown in FIG. 3. The user unsub related feature determiner 1325 may send the user unsub related features to the confidence score determiner 1350 for determining a confidence score for each possible unsubscribe recommendation or each recommended unsubscribe link.

The unsubscribability determiner 1340 in this example may also receive the unsubscribe recommendation request related to the user, e.g. from the user state determiner 720. The unsubscribability determiner 1340 may determine messages related to the unsubscribe recommendation request, and determine an unsubscribability for each message based on the stored unsubscribable messages 775 and the unsubscribe recommendation request. The unsubscribability determiner 1340 may send the information about message unsubscribability to the confidence score determiner 1350 for determining a confidence score for each possible unsubscribe recommendation or each recommended unsubscribe link.

The user feedback determiner 1320 in this example may receive the unsubscribe recommendation request from the user information determiner 1310, and receive sub/unsub related actions of the user, e.g. from the user state determiner 720. Based on the received information, the user feedback determiner 1320 may determine one or more user feedbacks from the user. For example, a user feedback from the user may be determined based on a user action of deleting or rejecting a previous unsubscribe recommendation generated by the unsubscribe recommender 730. The user feedback determiner 1320 may send the determined user feedback to the confidence score determiner 1350 for determining a confidence score for each possible unsubscribe recommendation or each recommended unsubscribe link.

It can be understood that in one embodiment, the user feedback determiner 1320 may operate offline.

The confidence score determiner 1350 in this example may receive the user unsub related features from the user unsub related feature determiner 1325, the information about message unsubscribability from the unsubscribability determiner 1340, and the user feedback information from the user feedback determiner 1320. Based on the received information, the confidence score determiner 1350 may determine possible recommended links and a confidence score for each possible recommended link. The confidence score determiner 1350 may send the possible recommended links along with their respective confidence scores to the unsubscribe recommendation generator 1360 for generating a list of ranked unsubscribe recommendations, where each unsubscribe recommendation is for recommending unsubscribing from a set of messages by following a link and is ranked according to its confidence score. The confidence score determiner 1350 may also send the possible recommended links along with their respective confidence scores to the presentation instruction generator 1370 for generating a presentation instruction.

The unsubscribe recommendation generator 1360 in this example may receive the possible recommended links along with their respective confidence scores from the confidence score determiner 1350, select at least some of the possible recommended links and rank them based on their respective scores. In one embodiment, the unsubscribe recommendation generator 1360 may first rank all possible recommended links based on their respective scores, and then select some of the possible recommended links for unsubscribe recommendations. The unsubscribe recommendation generator 1360 may then generate a ranked list of unsubscribe recommendations for the user and send the ranked list to the presentation instruction generator 1370 for generating a presentation instruction.

The presentation instruction generator 1370 in this example may receive the possible recommended links along with their respective confidence scores from the confidence score determiner 1350, and receive the ranked list of unsubscribe recommendations from the unsubscribe recommendation generator 1360. Based on the received information, the presentation instruction generator 1370 may generate a presentation instruction for presenting the ranked list of unsubscribe recommendations to the user. The presentation instruction may indicate how to present the ranked list, e.g. presenting an updated ranked list of unsubscribe recommendations with a certain frequency (like 3 times a day, 10 times a week); presenting the ranked list upon certain actions of the user, etc. In one embodiment, the presentation instruction may be personalized based on the information of the user, e.g. the presentation frequency may be different for different users depending on the user's action history; a ranked list of recommendations may be presented within certain time period of a day for one person, but presented within another time period of a day for another person; other parameters related to presentation, like font, size, layout of content items when presenting the unsubscribe recommendations, can all be personalized and/or updated based on the user's personal information and/or recent action history. The presentation instruction generator 1370 in this example may send both the ranked list of unsubscribe recommendations and a corresponding presentation instruction to the service provider 130 or directly to the user, such that the user can make a final decision about the unsubscription based on those unsubscribe recommendations.

Figure 14:
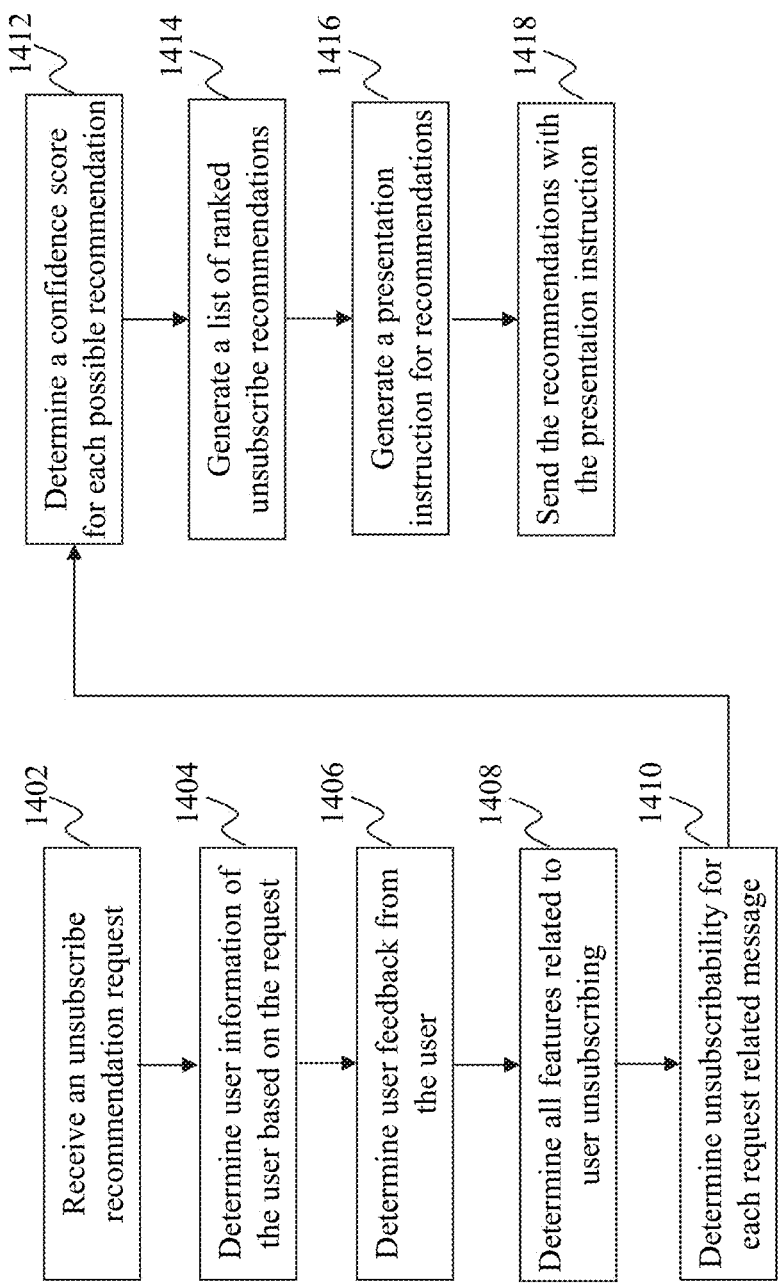
FIG. 14 is a flowchart of an exemplary process performed by an unsubscribe recommender, according to an embodiment of the present teaching.

FIG. 14 is a flowchart of an exemplary process performed by an unsubscribe recommender, e.g. the unsubscribe recommender 730 in FIG. 13, according to an embodiment of the present teaching. As shown in FIG. 14, an unsubscribe recommendation request is received at 1402. User information of the user is determined at 1404 based on the request. User feedback from the user may be determined at 1406. All features related to user unsubscribing can be determined at 1408. Unsubscribability may be determined at 1410 for each request related message.

A confidence score is determined at 1412 for each possible recommendation. A list of ranked unsubscribe recommendations is generated at 1414. A presentation instruction is generated at 1416 for recommendations. The recommendations are sent at 1418 with the presentation instruction.

It can be understood that the order of the steps shown in FIG. 8, FIG. 10, FIG. 12, and FIG. 14 may be changed according to different embodiments of the present teaching.

Figure 15:
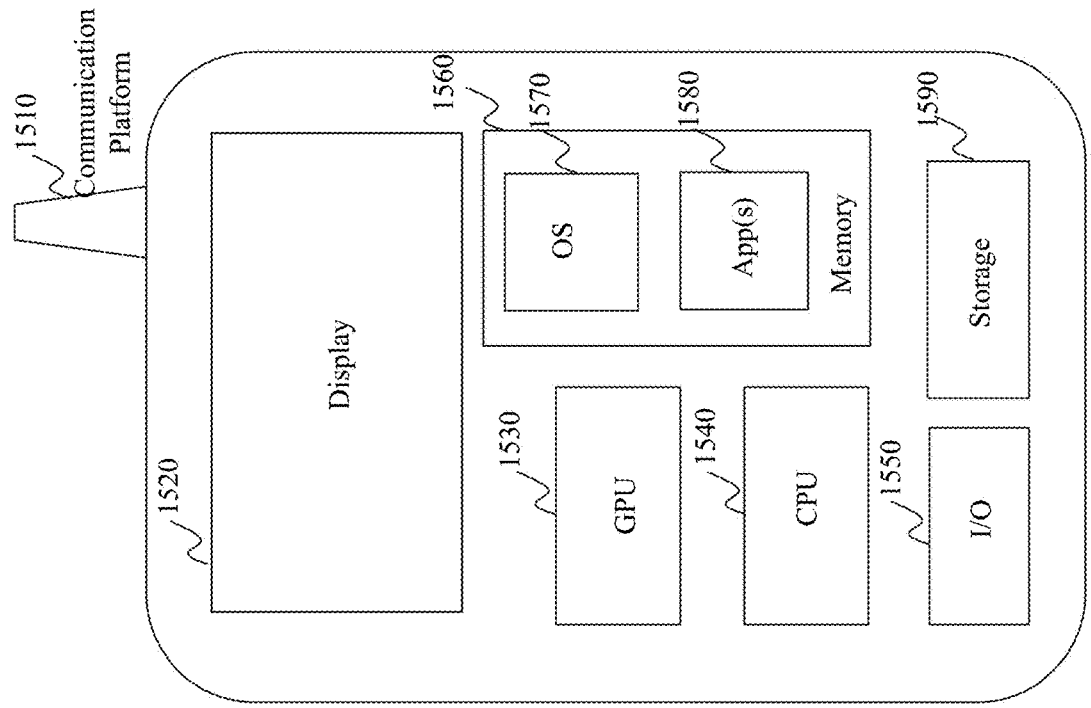
FIG. 15 depicts the architecture of a mobile device which can be used to implement a specialized system incorporating the present teaching.

FIG. 15 depicts the architecture of a mobile device which can be used to realize a specialized system implementing the present teaching. In this example, the user device on which a ranked list of recommendations is presented and interacted—with is a mobile device 1500, including, but is not limited to, a smart phone, a tablet, a handled gaming console, a global positioning system (GPS) receiver, and a wearable computing device (e.g., eyeglasses, wrist watch, etc.), or in any other form factor. The mobile device 1500 in this example includes one or more central processing units (CPUs) 1540, one or more graphic processing units (GPUs) 1530, a display 1520, a memory 1560, a communication platform 1510, such as a wireless communication module, storage 1590, and one or more input/output (I/O) devices

1550. Any other suitable component, including but not limited to a system bus or a controller (not shown), may also be included in the mobile device 1500. As shown in FIG. 15, a mobile operating system 1570, e.g., iOS, Android, Windows Phone, etc., and one or more applications 1580 may be loaded into the memory 1560 from the storage 1590 in order to be executed by the CPU 1540. The applications 1580 may include a browser or any other suitable mobile apps for presenting sub/unsub recommendations on the mobile device 1500. User interactions with the sub/unsub recommendations may be achieved via the I/O devices 1550 and provided to the subscription related recommendation engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the subscription related recommendation engine 140, the service provider 130 and/or other components of systems 100 and 200 described with respect to FIGS. 1-14). The hardware elements, operating systems and programming languages of such computers are conventional in nature, and it is presumed that those skilled in the art are adequately familiar therewith to adapt those technologies about providing sub/unsub recommendations as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 16:
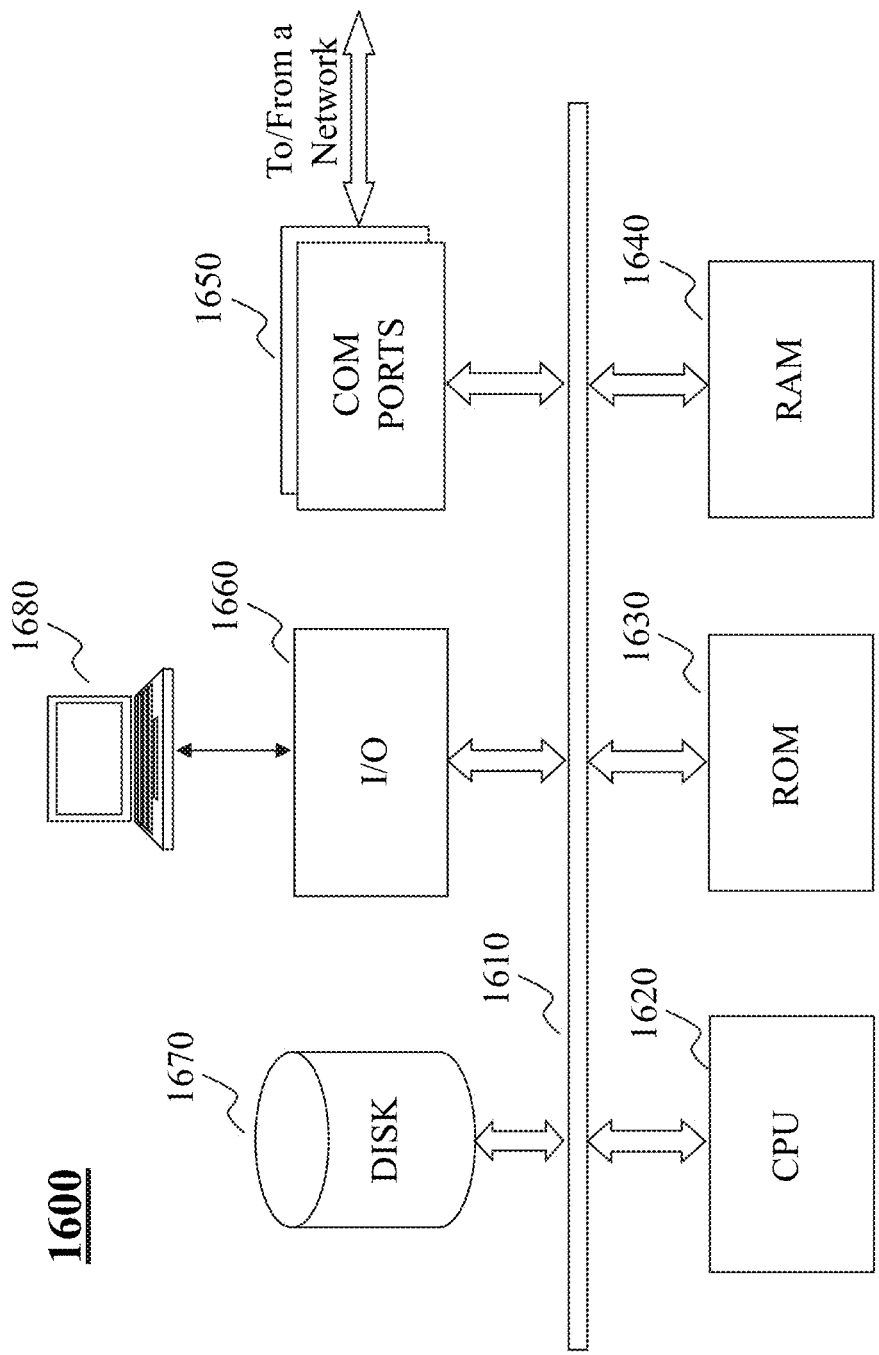
FIG. 16 depicts the architecture of a computer which can be used to implement a specialized system incorporating the present teaching.

FIG. 16 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1600 may be used to implement any component of the techniques of providing sub/unsub recommendations, as described herein. For example, the service provider 130, the subscription related recommendation engine 140, etc., may be implemented on a computer such as computer 1600, via its hardware, software program, firmware, or a combination thereof. Although only one such computer is shown, for convenience, the computer functions relating to providing sub/unsub recommendations as described herein may be implemented in a distributed fashion on a number of similar platforms, to distribute the processing load.

The computer 1600, for example, includes COM ports 1650 connected to and from a network connected thereto to facilitate data communications. The computer 1600 also includes a central processing unit (CPU) 1620, in the form of one or more processors, for executing program instructions. The exemplary computer platform includes an internal communication bus 1610, program storage and data storage of different forms, e.g., disk 1670, read only memory (ROM) 1630, or random access memory (RAM) 1640, for various data files to be processed and/or communicated by the computer, as well as possibly program instructions to be executed by the CPU. The computer 1600 also includes an I/O component 1660, supporting input/output flows between the computer and other components therein such as user interface elements 1680. The computer 1600 may also receive programming and data via network communications.

Hence, aspects of the methods of providing sub/unsub recommendations, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with providing sub/unsub recommendations. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, providing sub/unsub recommendations as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for providing a recommendation for subscribing to or unsubscribing from an electronic communication, the method comprising:
in an online phase,
obtaining information related to actions of a user taken at a current point in time with respect to electronic communications of the user, and
determining, via a trained model, based on the actions of the user and one or more categories of the electronic communications, a current state of the user at the current point in time, wherein the current state is a first state or a second state, wherein the first state indicates that the user expresses an interest in receiving additional electronic communications associated with the one or more categories based on one or more current interests of the user estimated from the actions of the user and the second state indicates that the user lacks an interest in the one or more categories of the electronic communications; and
in an offline phase,
determining the one or more categories of the electronic communications;
providing a subscribe recommendation for subscribing to electronic communications associated with at least one of the one or more categories if the current state is the first state, wherein the subscribe recommendation includes links to candidate subscriptions, each of which is capable of being acted on by the user to subscribe to a corresponding candidate subscription and is determined based on a similarity between a feature vector describing features of the user and a feature vector describing features of a sender of the corresponding candidate subscription, and
providing an unsubscribe recommendation comprising one or more links for unsubscribing electronic communications similar to at least some of the one or more categories of the electronic communications if the current state is the second state, wherein the unsubscribe recommendation comprises a ranked list of links to candidate unsubscriptions and senders associated with the candidate unsubscriptions, each of the links is capable of being acted on by the user to unsubscribe from a corresponding sender, and the ranked list is determined based on the user's past behavior related to messages from each sender and a popularity of each sender.

2. The method of claim 1, wherein determining the current state of the user comprises:
determining the current state of the user to be the second state based on a confidence score for each of the one or more categories of the electronic communications, wherein the actions of the user comprise at least one of: batch delete, batch archive, spam vote, delete without reading, or a raw unsubscription in response to the user clicking an unsub link in an electronic communication.

3. The method of claim 1, wherein determining the current state of the user comprises:
determining the current state of the user to be the first state based on a confidence score for each of the one or more categories of the electronic communications, wherein the actions of the user comprise the actions performed over the electronic communications, time spent over the electronic communications, or the actions of the user performed over the electronic communications and the time spent over the electronic communications.

4. The method of claim 1, wherein the electronic communications comprise messages related to the user, the method further comprises:
in the offline phase, classifying, the messages into various categories, wherein the current state of the user is determined based on the various categories that the messages were classified into, and the various categories comprise the one or more categories.

5. The method of claim 1, wherein in response to determining that the current state is the first state, the method further comprises:
determining user information of the user;
obtaining user feedback from the user regarding previous recommendations based on the user information; and
determining features related to user subscribing based on at least one of the user information, the user feedback, or the electronic communications, wherein the subscribe recommendation is determined based on at least one of the user information, the user feedback, or the features.

6. The method of claim 5, further comprising:
analyzing the information related to the actions of the user based on the one or more categories;
determining a plurality of candidate subscriptions capable of being subscribed to by the user based on a confidence score for each of the one or more categories, wherein the confidence score is further determined based on the features, and wherein each of the plurality of candidate subscriptions comprise a link for subscribing to a corresponding candidate subscription of the plurality of candidate subscriptions;
generating a list of ranked candidate subscriptions based on the plurality of candidate subscriptions and their respective confidence scores, wherein the list of ranked candidate subscriptions comprises the link for subscribing for each of the plurality of candidate subscriptions; and
generating a presentation instruction for causing the list of ranked candidate subscriptions to be presented based on their respective confidence scores, wherein the list of ranked candidate subscriptions is provided together with the presentation instruction.

7. The method of claim 1, wherein in response to determining that the current state is the second state, the method further comprises:
determining user information of the user;
obtaining user feedback from the user regarding previous recommendations based on the user information;

determining features related to user unsubscribing based on at least one of the user information, the user feedback, or the electronic communications; and determining unsubscribability for each of the electronic communications related to the second state based on at least one confidence score for a corresponding category of the electronic communication, the features, the user information, or the user feedback.

8. The method of claim 7, further comprising:

determining the candidate unsubscriptions based on the unsubscribability for each of the electronic communications;

generating the ranked list based on the candidate unsubscriptions and their respective confidence scores; and generating a presentation instruction for causing the ranked list to be presented based on their respective confidence scores, wherein the ranked list is provided together with the presentation instruction.

9. A system, having at least one processor, storage, and a communication platform connected to a network for providing a recommendation for subscribing to or unsubscribing from an electronic communication, comprising:

a user action collector configured for in an online phase, obtaining information related to actions of a user taken at a current point in time with respect to electronic communications of the user;

a user state determiner configured for in the online phase, determining, via a trained model, based on the actions of the user and one or more categories of the electronic communications, a current state of the user at the current point in time, wherein the current state is a first state or a second state, wherein the first state indicates that the user expresses an interest in receiving additional electronic communications associated with the one or more categories based on one or more current interests of the user estimated from the actions of the user and the second state indicates that the user lacks an interest in the one or more categories of the electronic communications;

a message category extractor configured for in an offline phase, determining the one or more categories of the electronic communications;

a subscribe recommender configured for in the offline phase, providing a subscribe recommendation for subscribing to electronic communications associated with at least one of the one or more categories if the current state is the first state, wherein the subscribe recommendation includes links to candidate subscriptions, each of which is capable of being acted on by the user to subscribe to a corresponding candidate subscription and is determined based on a similarity between a feature vector describing features of the user and a feature vector describing features of a sender of the corresponding candidate subscription; and an unsubscribe recommender configured for in the offline phase, providing an unsubscribe recommendation comprising one or more links for unsubscribing electronic communications similar to at least some of the one or more categories of the electronic communications if the current state is the second state, wherein the unsubscribe recommendation comprises a ranked list of links to candidate unsubscriptions and senders associated with the candidate unsubscriptions, each of the links is capable of being acted on by the user to unsubscribe from a corresponding sender, and the ranked list is determined based on the user's past behavior related to messages from each sender and a popularity of each sender.

10. The system of claim 9, wherein the user state determiner is configured for:

determining the current state of the user to be the second state based on a confidence score for each of the one or more categories of the electronic communications, wherein the actions of the user comprise at least one of: batch delete, batch archive, spam vote, delete without reading, or a raw unsubscription in response to the user clicking an unsub link in an electronic communication.

11. The system of claim 9, wherein the user state determiner is configured for:

determining the current state of the user to be the first state based on a confidence score for each of the one or more categories of the electronic communications, wherein the actions of the user comprise the actions performed over the electronic communications, time spent over the electronic communications, or the actions of the user performed over the electronic communications and the time spent over the electronic communications.

12. The system of claim 9, wherein the electronic communications comprise messages related to the user, the system further comprises:

a message category classifier configured for in the offline phase, classifying, the messages into various categories, wherein the current state of the user is determined based on the various categories that the messages were classified into, and the various categories comprise the one or more categories.

13. The system of claim 9, wherein the subscribe recommender comprises:

a user information determiner configured for determining user information of the user;

a user feedback determiner configured for obtaining user feedback from the user regarding previous recommendations based on the user information; and a user subscribe related feature determiner configured for determining features related to user subscribing based on at least one of the user information, the user feedback, or the electronic communications in response to determining that the current state is the first state, wherein the subscribe recommendation is determined based on at least one of the user information, the user feedback, or the features.

14. The system of claim 13, wherein the subscribe recommender further comprises:

a category based action analyzer configured for analyzing the information related to the actions of the user based on the one or more categories, wherein a confidence score determiner configured for determining a plurality of candidate subscriptions capable of being subscribed to by the user based on a confidence score for each of the one or more categories, wherein the confidence score is further determined based on the features, and wherein each of the plurality of candidate subscriptions comprise a link for subscribing to a corresponding candidate subscription of the plurality of candidate subscriptions;

a subscribe recommendation generator configured for generating a list of ranked candidate subscriptions based on the plurality of candidate subscriptions and their respective confidence scores, wherein the list of ranked candidate subscriptions comprises the link for subscribing for each of the plurality of candidate subscriptions; and a presentation instruction generator configured for generating a presentation instruction for causing the list of ranked candidate subscriptions to be presented based on their respective confidence scores, wherein the list of ranked candidate subscriptions are provided together with the presentation instruction.

15. The system of claim 9, wherein the unsubscribe recommender comprises:
a user information determiner configured for determining user information of the user;
a user feedback determiner configured for obtaining user feedback from the user regarding previous recommendations based on the user information;
a user unsub related feature determiner configured for determining features related to user unsubscribing based on at least one of the user information, the user feedback, or the electronic communications; and
an unsubscribability determiner configured for determining unsubscribability for each of the electronic communications related to the second state based on at least one of a confidence score for a corresponding category of the electronic communication, the features, the user information, or the user feedback.

16. The system of claim 15, wherein the system further comprises:
a confidence score determiner configured for determining the candidate unsubscriptions based on the unsubscribability for each of the electronic communications, and wherein the unsubscribe recommender further comprises:
an unsubscribe recommendation generator configured for generating the ranked list based on the candidate unsubscriptions and their respective confidence scores; and
a presentation instruction generator configured for generating a presentation instruction for causing the ranked list to be presented based on their respective confidence scores, wherein the ranked list is provided together with the presentation instruction.

17. A non-transitory machine-readable medium having information recorded thereon for providing a recommendation for subscribing to or unsubscribing from an electronic communication, wherein the information, when read by a machine, causes the machine to perform operations comprising:
in an online phase,
obtaining information related to actions of a user taken at a current point in time with respect to electronic communications of the user, and
determining, via a trained model, based on the actions of the user and one or more categories of the electronic communications, a current state of the user at the current point in time, wherein the current state is a first state or a second state, wherein the first state indicates that the user expresses an interest in receiving additional electronic communications associated with the one or more categories based on one or more current interests of the user estimated from the actions of the user and the second state indicates that the user lacks an interest in the one or more categories of the electronic communications; and
in an offline phase,
determining the one or more categories of the electronic communications;
providing a subscribe recommendation for subscribing to electronic communications associated with the at least one of the one or more categories if the current state is the first state, wherein the subscribe recommendation includes links to candidate subscriptions, each of which is capable of being acted on by the user to subscribe to a corresponding candidate subscription and is determined based on a similarity between a feature vector describing features of the user and a feature vector describing features of a sender of the corresponding candidate subscription, and
providing an unsubscribe recommendation comprising one or more links for unsubscribing electronic communications similar to at least some of the one or more categories of the electronic communications if the current state is the second state, wherein the unsubscribe recommendation comprises a ranked list of links to candidate unsubscriptions and senders associated with the candidate unsubscriptions, each of the links is capable of being acted on by the user to unsubscribe from a corresponding sender, and the ranked list is determined based on the user's past behavior related to messages from each sender and a popularity of each sender.

18. The medium of claim 17, wherein determining the current state of the user comprise:
determining the current state of the user to be the second state based on a confidence score for each of the one or more categories of the electronic communications, wherein the actions of the user comprise at least one of: batch delete, batch archive, spam vote, delete without reading, or a raw unsubscription in response to the user clicking an unsub link in an electronic communication.

19. The medium of claim 17, wherein determining the current state of the user comprises:
determining the current state of the user to be the first state based on a confidence score for each of the one or more categories of the electronic communications, wherein the actions of the user comprise the actions performed over the electronic communications, time spent over the electronic communications, or the actions of the user performed over the electronic communications and the time spent over the electronic communications.

20. The medium of claim 17, wherein the electronic communications comprise messages related to the user, the operations further comprise:
in the offline phase, classifying, the messages into various categories, wherein the current state of the user is determined based on the various categories that the messages were classified into, and the various categories comprise the one or more categories.

21. The medium of claim 17, wherein in response to determining that the current state is the first state, the operations further comprise:
determining user information of the user;
obtaining user feedback from the user regarding previous recommendations based on the user information; and
determining features related to user subscribing based on at least one of the user information, the user feedback, or the electronic communications, wherein the subscribe recommendation is determined based on at least one of the user information, the user feedback, or the features.

22. The medium of claim 21, wherein the operations further comprise:
analyzing the information related to the actions of the user based on the one or more categories;

determining a plurality of candidate subscriptions capable of being subscribed to by the user based on a confidence score for each of the one or more categories, wherein the confidence score is further determined based on the features, and wherein each of the plurality of candidate subscriptions comprise a link for subscribing to a corresponding candidate subscription of the plurality of candidate subscriptions;

generating a list of ranked candidate subscriptions based on the plurality of candidate subscriptions and their respective confidence scores, wherein the list of ranked candidate subscriptions comprises the link for subscribing for each of the plurality of candidate subscriptions; and generating a presentation instruction for causing the list of ranked candidate subscriptions to be presented based on their respective confidence scores, wherein the list of ranked candidate subscriptions are provided together with the presentation instruction.

23. The medium of claim 17, wherein in response to determining that the current state is the second state, the operations further comprise:

determining user information of the user;

obtaining user feedback from the user regarding previous recommendations based on the user information;

determining features related to user unsubscribing based on at least one of the user information, the user feedback, or the electronic communications; and determining unsubscribability for each of the electronic communications related to the second state based on at least one confidence score for a corresponding category of the electronic communication, the features, the user information, or the user feedback.

24. The medium of claim 23, wherein the operations further comprise:

determining the candidate unsubscriptions based on the unsubscribability for each of the electronic communications;

generating the ranked list based on the candidate unsubscriptions and their respective confidence scores; and generating a presentation instruction for causing the ranked list to be presented based on their respective confidence scores, wherein the ranked list is provided together with the presentation instruction.

\* \* \* \* \*